US012666480B2

(12) United States Patent
Cheong et al.

(10) Patent No.: US 12,666,480 B2
(45) Date of Patent: Jun. 23, 2026

(54) ELECTRONIC DEVICE FOR OPERATING LINK AND OPERATION METHOD THEREOF

(71) Applicant: Samsung Electronics Co., Ltd., Suwon-si (KR)

(72) Inventors: Gupil Cheong, Suwon-si (KR); Doosu Na, Suwon-si (KR); Yunsik Bae, Suwon-si (KR); Juyeon Jin, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 17/860,877

(22) Filed: Jul. 8, 2022

(65) Prior Publication Data

US 2022/0346167 A1 Oct. 27, 2022

Related U.S. Application Data

(63) Continuation of application No. PCT/KR2021/013369, filed on Sep. 29, 2021.

(30) Foreign Application Priority Data

Sep. 29, 2020 (KR) ........................ 10-2020-0127367

(51) Int. Cl.
*H04W 4/00* (2018.01)
*H04L 5/00* (2006.01)
(Continued)

(52) U.S. Cl.
CPC ........... *H04W 76/15* (2018.02); *H04L 5/0053* (2013.01); *H04W 76/14* (2018.02)

(58) Field of Classification Search
CPC ...................................................... H04W 76/15
See application file for complete search history.

(56) References Cited

U.S. PATENT DOCUMENTS 6,499,079 B1 * 12/2002 Gulick ................... G06F 13/36
710/305
9,686,049 B2 6/2017 Fischer
(Continued)

FOREIGN PATENT DOCUMENTS

CN 109462841 A 3/2019
CN 111669734 A 9/2020
(Continued)

OTHER PUBLICATIONS

Extended European Search Report dated Jan. 11, 2024, issued in European Patent Application No. 21876041.1.
(Continued)

*Primary Examiner* — Elisabeth Benoit Magloire
(74) *Attorney, Agent, or Firm* — Jefferson IP Law, LLP

(57) ABSTRACT

An electronic device is provided. The electronic device includes a communication circuit, and at least one processor operably coupled to the communication circuit. The at least one processor may be configured to identify whether a first communication link and a second communication link can be integrated, based on first information related to a first external device coupled through the first communication link and second information related to a second external device coupled through the second communication link, establish a common communication link with the first external device and the second external device, in response to identifying that the first communication link and the second communication link can be integrated, and transmit data to the first external device and the second external device through the common communication link.

16 Claims, 15 Drawing Sheets

(51) Int. Cl.
  H04W 76/14 (2018.01)
  H04W 76/15 (2018.01)

(56) References Cited

U.S. PATENT DOCUMENTS

| | | | |
|---|---|---|---|
| 11,166,140 | B2 | 11/2021 | Cheong et al. |
| 11,943,079 | B2 | 3/2024 | Cheong et al. |
| 12,133,294 | B2 | 10/2024 | Cheong et al. |
| 12,150,188 | B2 | 11/2024 | Choi et al. |
| 2005/0256977 | A1* | 11/2005 | Dehaemer ........... G06F 13/1684 710/5 |
| 2014/0323131 | A1* | 10/2014 | Yun ................... H04W 36/0069 455/436 |
| 2018/0077493 | A1 | 3/2018 | Watson et al. |
| 2018/0205813 | A1 | 7/2018 | Watson et al. |
| 2018/0267891 | A1* | 9/2018 | Sheffler ................. G06F 12/023 |
| 2019/0098087 | A1 | 3/2019 | Johnston et al. |
| 2020/0128394 | A1 | 4/2020 | Han et al. |
| 2020/0288519 | A1 | 9/2020 | Cheong et al. |
| 2020/0296793 | A1 | 9/2020 | Cheong et al. |
| 2022/0141893 | A1 | 5/2022 | Choi et al. |
| 2022/0150092 | A1 | 5/2022 | Cheong et al. |

FOREIGN PATENT DOCUMENTS

| | | | |
|---|---|---|---|
| CN | 111698668 | A | 9/2020 |
| EP | 3 923 537 | A1 | 12/2021 |
| KR | 10-2016-0094877 | A | 8/2016 |
| KR | 10-2018-0091670 | A | 8/2018 |
| KR | 10-2020-0045367 | A | 5/2020 |
| KR | 10-2020-0106741 | A | 9/2020 |
| KR | 10-2020-0106743 | A | 9/2020 |
| KR | 10-2020-0106744 | A | 9/2020 |
| KR | 10-2020-0110086 | A | 9/2020 |
| WO | 2008/051718 | A2 | 5/2008 |
| WO | 2020/180056 | A1 | 9/2020 |
| WO | 2020/180113 | A1 | 9/2020 |

OTHER PUBLICATIONS

Chinese Office Action with English translation dated Aug. 28, 2025; Chinese Appln. No. 202180066599.7.
Korean Office Action with English translation dated Feb. 10, 2026; Korean Appln. No. 10-2020-0127367.
Chinese Office Action with English translation dated Mar. 2, 2026; Chinese Appln. No. 202180066599.7.
European Communication pursuant to Article 94(3) EPC dated Mar. 3, 2026; European Appln. No. 21 876 041.1-1206.

* cited by examiner

ELECTRONIC DEVICE FOR OPERATING LINK AND OPERATION METHOD THEREOF

CROSS-REFERENCE TO RELATED APPLICATION(S)

This application is a continuation application, claiming priority under § 365(c), of an International application No. PCT/KR2021/013369, filed on Sep. 29, 2021, which is based on and claims the benefit of a Korean patent application number 10-2020-0127367, filed on Sep. 29, 2020, in the Korean Intellectual Property Office, the disclosure of which is incorporated by reference herein in its entirety.

TECHNICAL FIELD

The disclosure relates to an electronic device for operating a link, and an operating method thereof.

BACKGROUND ART

In a wireless communication system, an electronic device may set a connection interval when a communication link with an external electronic device is established. The electronic device may perform communication with the external electronic device every connection interval. The electronic device may transmit data to the external electronic device and may receive a signal indicating whether data is normally received from the external electronic device after a specific period elapses.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide an electronic device to increase efficiency of a communication link by integrating a plurality of communication links with external electronic devices.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication circuit, and at least one processor operably coupled to the communication circuit. The at least one processor may be configured to identify whether a first communication link and a second communication link can be integrated, based on first information related to a first external device coupled through the first communication link and second information related to a second external device coupled through the second communication link, establish a common communication link with the first external device and the second external device in response to identifying that the first communication link and the second communication link can be integrated, and transmit data to the first external device and the second external device through the common communication link.

In accordance with another aspect of the disclosure, a method performed by an electronic device is provided. The method may include identifying whether a first communication link and a second communication link can be integrated, based on first information related to a first external device coupled through the first communication link and second information related to a second external device coupled through the second communication link, establishing a common communication link with the first external device and the second external device in response to identifying that the first communication link and the second communication link can be integrated, and transmitting data to the first external device and the second external device through the common communication link.

In accordance with another aspect of the disclosure, an electronic device is provided. The electronic device includes a communication circuit, and at least one processor operably coupled to the communication circuit. The at least one processor may be configured to transmit data to a first external device coupled through a first communication link, receive a response for the data from the first external device at a first response time, and identify whether the response is an ACKnowledgement (ACK) or a Negative ACKnowledgement (NACK).

Advantageous Effects of Invention

In an electronic device and method according to an embodiment of the disclosure, the electronic device can improve efficiency of a communication link by integrating a plurality of communication links with external electronic devices.

Other aspects, advantages and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
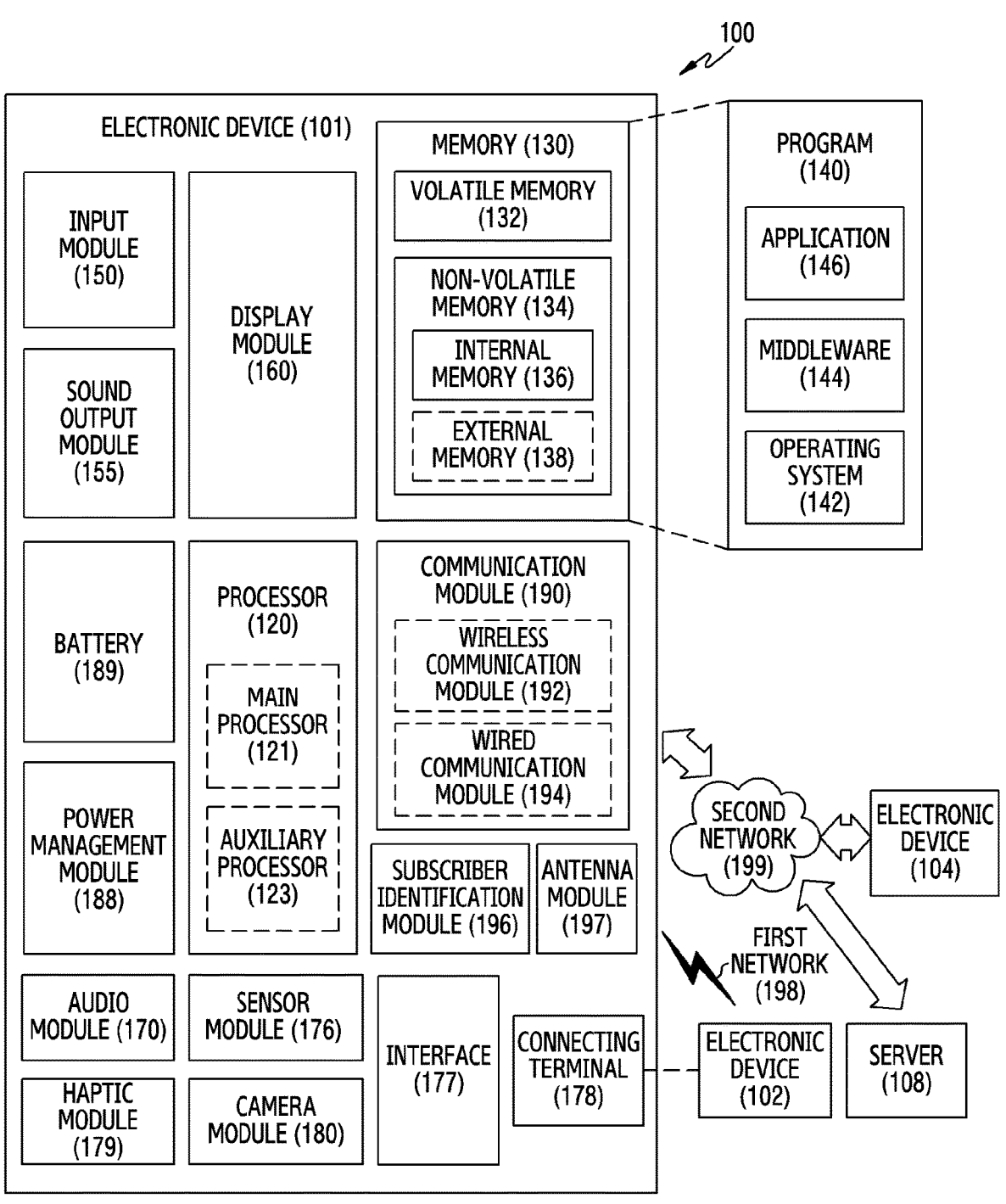
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture an image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
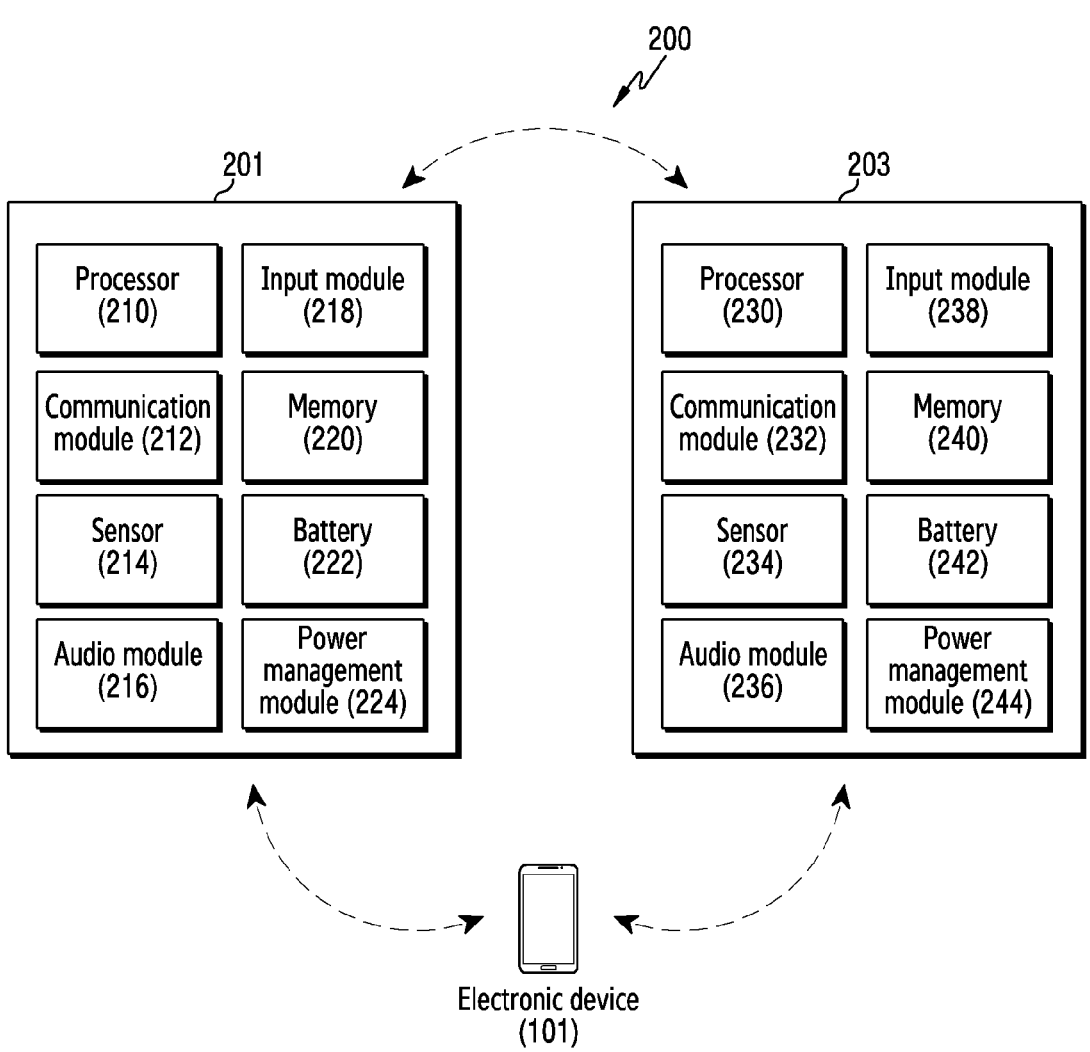
FIG. 2 illustrates electronic devices according to an embodiment of the disclosure.

FIG. 2 illustrates electronic devices according to an embodiment of the disclosure.

Referring to FIG. 2, electronic devices 200 may include a first external electronic device 201 and a second external electronic device 203 in a type (e.g., an ear wearable type) operable in a state of being worn (or inserted) on the electronic device 101 and a user's body (e.g., an ear). In an embodiment, the first external electronic device 201 and the second external electronic device 203 may be one of an earphone, a headphone, a speaker, a TeleVision (TV), a headset, an audio device, a portable multimedia playback device, a smartphone, a tablet, a Personal Computer (PC), a laptop, a desktop, and an MPEG-1 Audio Layer 3 (MP3) player.

In an embodiment, the first external electronic device 201 may include a processor 210, a communication module 212, a sensor 214, an audio module 216, an input module 218, a memory 220, a battery 222, a power management module 224, or a combination thereof.

In an embodiment, the processor 210 may provide overall control to the first external electronic device 201. The processor 210 may receive data of other components of the first external electronic device 201, may interpret the received data, and may calculate the interpreted data.

In an embodiment, the processor 210 may control the communication module 212 so that the first external electronic device 201 establishes a communication link (e.g., Bluetooth pairing) with another electronic device (e.g., the electronic device 101, the second external electronic device 203).

In an embodiment, a communication link between the electronic device 101 and the first external electronic device 201 may be referred to as a first communication link. In an embodiment, a communication link between the electronic device 101 and the second external electronic device 203 may be referred to as a second communication link. In an embodiment, a communication link between the first external electronic device 201 and the second external electronic device 203 may be referred to as a third communication link.

In an embodiment, the electronic device 101, the first external electronic device 201, and the second external electronic device 203 may configure a first wireless connection structure. In an embodiment, the first wireless connection structure may be configured in such a manner that the first communication link is established between the electronic device 101 and the first external electronic device 201, and the third communication link is established between the first external electronic device 201 and the second external electronic device 203. In an embodiment, in the first wireless connection structure, wireless communication may be achieved in such a manner that the electronic device 101 transmits data to the first external electronic device 201, and the first external electronic device 201 transmits to the second external electronic device 203 the data received from the electronic device 101.

In an embodiment, the electronic device 101, the first external electronic device 201, and the second external electronic device 203 may configure a second wireless connection structure. In an embodiment, the second wireless connection structure may be configured in such a manner that the first communication link is established between the electronic device 101 and the first external electronic device 201, and the second communication link is established between the first external electronic device 201 and the second external electronic device 203. In an embodiment, in the second wireless connection structure, wireless communication may be achieved in such a manner that the electronic device 101 transmits data to the first external electronic device 201 through the first communication link and transmits data to the second external electronic device 203 through the second communication link.

In an embodiment, the electronic device 101, the first external electronic device 201, and the second external electronic device 203 may configure a third wireless connection structure. In an embodiment, the third wireless connection structure may be configured in such a manner that the second external electronic device 203 monitors the first communication link to obtain data transmitted by the electronic device 101 to the first external electronic device 201, in a state in which the first communication link is established between the electronic device 101 and the first external electronic device 201, and the third communication link is established between the first external electronic device 201 and the second external electronic device 203. In an embodiment, in the third wireless connection structure, wireless communication may be achieved in such a manner that the electronic device 101 transmits data to the first external electronic device 201, and the second external electronic device 203 monitors the first communication link to obtain the data.

In an embodiment, the first wireless connection structure, the second wireless connection structure, and the third wireless communication structure may be referred to as an Audio over Bluetooth Low Energy (AoBLE) topology. Although the first wireless connection structure to the third wireless connection structure are described in FIG. 2, an embodiment according to the disclosure is not limited thereto. In an embodiment according to the disclosure, one or more external electronic devices may be included, and the electronic device 101 may configure a wireless connection structure which establishes a communication link directly or indirectly with one or more external electronic devices.

In an embodiment, the sensor 214 may detect an operational state (e.g., power or temperature) of the first external electronic device 201 or an environmental state (e.g., a state of a user) external to the first external electronic device 201, and then generate an electrical signal or data value corresponding to the detected state. In an embodiment, the sensor 214 may include a gesture sensor, a gyro sensor, an atmospheric pressure sensor, a magnetic sensor, an acceleration sensor, a grip sensor, a proximity sensor, a color sensor, an InfraRed (IR) sensor, a biometric sensor, a temperature sensor, a humidity sensor, an illuminance sensor, or a combination thereof. In an embodiment, the sensor 214 may be disposed to be closely in contact with at least part of a body in a state in which the first external electronic device 201 is worn (or inserted) on the body. In an embodiment, the sensor 214 may identify an event for generating an advertising signal. In an embodiment, the event for generating the advertising signal may include wearing of the first external electronic device 201, detaching from a case of the first external electronic device 201, a user input, or a combination thereof.

In an embodiment, when a communication link with a different electronic device (e.g., the electronic device 101, the second external electronic device 203) is established, the processor 210 may receive data from the different electronic device (e.g., the electronic device 101, the second external electronic device 203) by using the communication module 212. In an embodiment, data received from a different electronic device (e.g., the electronic device 101) may be data including an audio signal.

In an embodiment, the processor 210 may provide the audio module 216 with the data from the different electronic device (e.g., the electronic device 101). In an embodiment, the audio module 216 may include a speaker. In an embodiment, the audio module 216 may convert (e.g., decode) the provided data into an audio signal, and may output the converted audio signal through the speaker.

In an embodiment, the processor 210 may receive data from the different electronic device (e.g., the electronic device 101) by using the communication module 212, and may transmit to the different electronic device (e.g., the electronic device 101) a response indicating whether the data is normally received.

In an embodiment, the input module 218 may receive an input from a user. In an embodiment, the input received from the user may be an input for controlling a volume of an audio signal which is output through the first external electronic device 201 or for reproducing a next song.

In an embodiment, the input module 218 may include a touch panel. In an embodiment, the input module 218 may detect a touch input or a hovering input by using the touch panel. In an embodiment, the input module 218 may include a physical key.

In an embodiment, the input module 218 may provide the processor 210 with data indicating the input received from the user.

In an embodiment, the battery 222 may supply power to a component of the first external electronic device 201. In an embodiment, the battery 222 may be charged when the first external electronic device 201 is placed (or connected) to a specified charging device (e.g., a case).

In an embodiment, the power management module 224 may manage power supplied to the first external electronic device 201 through the battery 222. In an embodiment, the power management module 224 may be configured as at least part of a Power Management Integrated Circuit (PMIC).

In an embodiment, the power management module 224 may measure a power level of the battery 222 of the first external electronic device 201. In an embodiment, the power management module 224 may provide the processor 210 with information on the power level. In an embodiment, the processor 210 may transmit, to the different electronic device (e.g., the electronic device 101), information on a remaining power level of the battery 222 of the first external electronic device 201.

In an embodiment, the second external electronic device 203 may be a device corresponding to the first external electronic device 201. In an embodiment, a processor 230, communication module 232, sensor 234, audio module 236, input module 238, memory 240, battery 242, and power management module 244 of the second external electronic device 203 may respectively correspond to the processor 210, communication module 212, sensor 214, audio module 216, input module 218, memory 220, battery 222, and power management module 224 of the first external electronic device 201.

Figure 3:
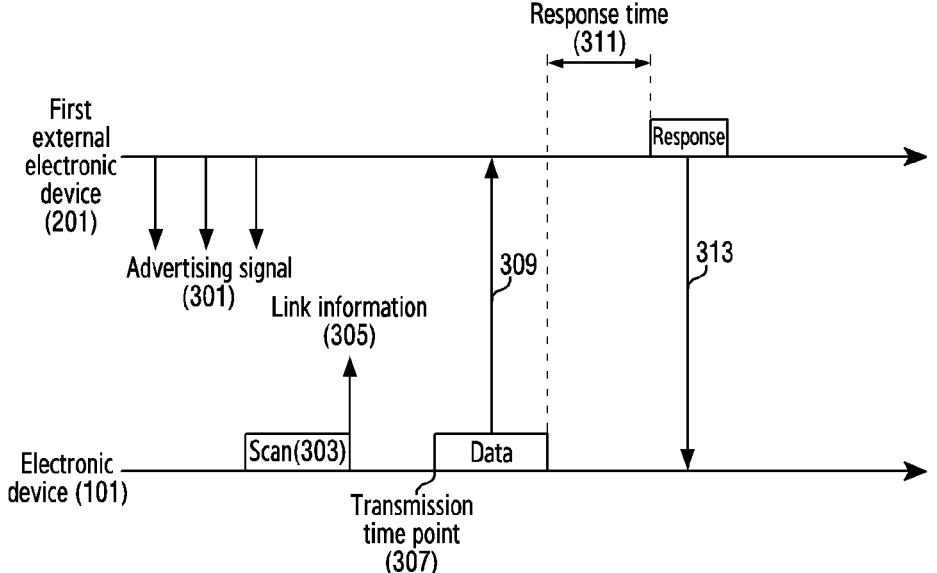
FIG. 3 illustrates a signal flow between an electronic device for establishing a communication link and a first external electronic device according to an embodiment of the disclosure.

FIG. 3 illustrates a signal flow between an electronic device for establishing a communication link and a first external electronic device according to an embodiment of the disclosure. Operations of the electronic device 101 for establishing a communication link with the first external electronic device 201 are described in FIG. 3.

Referring to FIG. 3, in operation 301, an advertising signal may be transmitted from the first external electronic device 201 as a request for establishing a communication link. In an embodiment, the advertising signal may be transmitted from the first external electronic device 201, based on a specified interval, wearing of the first external electronic device 201, detaching from a case of the first external electronic device 201, supplying of power, or a combination thereof.

In an embodiment, the advertising signal may be transmitted periodically from the first external electronic device 201. In an embodiment, the advertising signal may be transmitted from the first external electronic device 201 periodically in a broadcast or multicast manner.

In an embodiment, the advertising signal may include information for establishing a communication link with a neighboring electronic device (e.g., the electronic device 101). In an embodiment, the advertising signal may include identity information of the first external electronic device 201, user account information associated with the first external electronic device 201, current pairing information of the first external electronic device 201, a list of devices paired prior to the first external electronic device 201, capability information of simultaneous pairing that can be performed by the first external electronic device 201, transmit power of the first external electronic device 201, battery state information of the first external electronic device 201, a detection area of the first external electronic device 201, role information of the first external electronic device 201, information on data to be received by the first external electronic device 201, or a combination thereof.

In operation 303, the electronic device 101 may scan the advertising signal to recognize the first external electronic device 201. In an embodiment, the electronic device 101 may scan the advertising signal to recognize the first external electronic device 201, based on a pre-set scan interval. In an embodiment, when the advertising signal is scanned, the electronic device 101 may display on the display device 160 a User Interface (UI) for establishing a communication link with the first external electronic device 201. In an embodiment, the UI may include an object indicating the first external electronic device 201. In an embodiment, the electronic device 101 may determine whether the communication link with the first external electronic device 201 is established according to a user input (e.g., accepting or rejecting the establishment of the link) for the UI. In an embodiment, when the first external electronic device 201 is paired previously, the electronic device 101 may establish the communication link with the first external electronic device 201, irrespective of the user input.

In operation 305, the electronic device 101 may transmit information related to the communication link to the first external electronic device 201. In an embodiment, the information related to the communication link may include information indicating a transmission time point, an access address, a connection interval, a slave latency, a connection supervision timeout, a response time, or a combination thereof. In an embodiment, the transmission time point may be a time point at which the electronic device 101 transmits data to the first external electronic device 201 on a communication link to be established. In an embodiment, the access address may be used to exclude a packet of another physical packet. In an embodiment, the connection interval may be an interval between transmission time points which are periodical between the electronic device 101 and the first external electronic device 201. In an embodiment, the slave latency may be the number of times by which a connection is not released even if the first external electronic device 201 does not respond to data transmission of the electronic device 101. In an embodiment, the connection supervision timeout may be a period in which the connection is regarded as being released when there is no valid data transmission/reception between the electronic device 101 and the first external electronic device 201 during a specified time. In an embodiment, the response time may be a time required after the electronic device 101 transmits data to the first external electronic device 201 and until a response for the data is received. In an embodiment, the response time may be referred to as The Inter Frame Space (T_IFS). In an embodiment, the T_IFS may be a value (e.g., 150 μs) assigned fixedly to the first external electronic device 201.

In operation 309, the electronic device 101 may transmit data to the first external electronic device 201. In an embodiment, the electronic device 101 may transmit data to the first external electronic device 201 from a transmission time point 307.

In operation 313, the electronic device 101 may receive a response for the data from the first external electronic device 201. In an embodiment, the electronic device 101 may transmit data and receive a response for the data from the first external electronic device 201 at a response time 311. In an embodiment, the response for the data may be an ACKnowledgement (ACK) indicating that the first external electronic device 201 normally receives the data. In an embodiment, the response for the data may be a Negative ACKnowledgement (NACK) indicating that the first external electronic device 201 does not normally receive the data.

In an embodiment, the electronic device 101 and the first external electronic device 201 may communicate whether data is normally received, based on a Sequence Number (SN) and a Next Expected Sequence Number (NESN). In an embodiment, the SN may be 1-bit information included in a data channel Protocol Data Unit (PDU). In an embodiment, the NESN may be 1-bit information included in the data channel PDU.

In an embodiment, the first external electronic device 201 may identify whether data is retransmitted data or next data, based on the SN and the NESN. In an embodiment, if the SN and the NESN are identical to each other, the first external electronic device 201 may identify that the next data is received. In an embodiment, if it is identified that the next data is received, the first external electronic device 201 may increase the NESN. In an embodiment, if the SN and the NESN are different from each other, the first external electronic device 201 may identify that the same data is retransmitted.

In an embodiment, the electronic device 101 may identify whether the received response is the ACK or the NACK, based on the SN and the NESN. In an embodiment, if the SN and the NESN are different, the electronic device 101 may identify that the received response is the ACK. In an embodiment, if it is identified that the received response is the ACK, the electronic device 101 may increase the SN and transmit the next data. In an embodiment, if the SN and the NESN are identical, the electronic device 101 may identify that the received response is the NACK. In an embodiment, if it is identified that the received response is the NACK, the electronic device 101 may retransmit data.

Referring to the above description, the electronic device 101 may perform communication in such a manner that data is transmitted to the first external electronic device 201 and a response is received after a fixed T_IFS elapses. Therefore, when the electronic device 101 needs to perform an operation (e.g., Wireless Fidelity (WiFi)/Bluetooth coexistence) based on different wireless communication having a high priority or an operation (e.g., Bluetooth concurrency) based on the same wireless communication within the connection interval, communication with the first external electronic device 201 may not be complete in the connection interval. When a situation is repeated in which the electronic device 101 does not complete communication with the first external electronic device 201, the same data is transmitted several times, which results in a waste of resources of the electronic device 101. Since this also results in deterioration in communication quality, there is a need for a method of adjusting a response time with respect to the first external electronic device 201.

Figure 4:
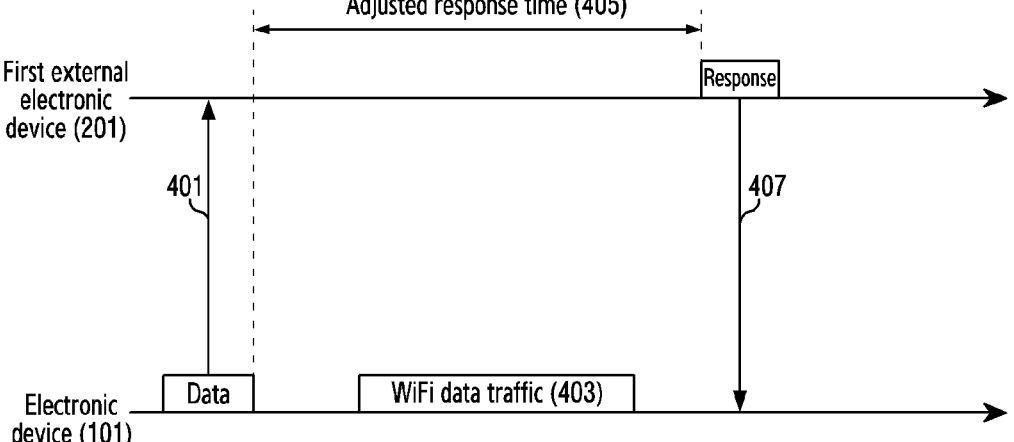
FIG. 4 illustrates a signal flow between an electronic device for adjusting a response time and a first external electronic device according to an embodiment of the disclosure.

FIG. 4 illustrates a signal flow between an electronic device for adjusting a response time and a first external electronic device according to an embodiment of the disclosure. A procedure of adjusting a response time is described in FIG. 4, when the electronic device 101 establishes a first communication link with the first external electronic device 201.

In an embodiment, the electronic device 101 and the first external electronic device 201 may determine an adjusted response time 405. In an embodiment, the electronic device 101 may determine the response time 405 adjusted based on a connection interval, a size of data to be transmitted to the first external electronic device 201, a time depending on a WiFi/Bluetooth coexistence operation, a time depending on a Bluetooth concurrency operation, a battery state of electronic devices (e.g., the electronic device 101, the first external electronic device 201), whether a service is performed on a real-time basis, a size of a response, or a combination thereof. In an embodiment, the adjusted response time 405 may be shorter than a response time before being adjusted (e.g., 150 μs). In an embodiment, the adjusted response time 405 may be longer than the response time before being adjusted (e.g., 150 μs). In an embodiment, the adjusted response time 405 may be a maximum time in which the electronic device 101 can transmit data to the first external electronic device 201 and receive a response from the first external electronic device 201 within the connection interval.

In an embodiment, the electronic device 101 may adjust a response time when a first communication link with the first external electronic device 201 is established. For example, the electronic device 101 may insert information on the adjusted response time 405 into information related to the communication link and transmit the resultant information to the first external electronic device 201. In an embodiment, the electronic device 101 may establish the first communication link with the first external electronic device 201 and then adjust the response time. In an embodiment, the electronic device 101 may establish the first communication link with the first external electronic device 201 and then adjust the response time, based on a specific event. In an embodiment, the electronic device 101 may adjust the response time, if the number of times of retransmitting the same data to the first external electronic device 201 is greater than or equal to a specified value (e.g., 3). In an embodiment, the electronic device 101 may adjust the response time, by transmitting a link change message to the first external electronic device 201. In an embodiment, the link change message may include information on the adjusted response time 405.

Referring to FIG. 4, in operation 401, the electronic device 101 may transmit data to the first external electronic device 201 through the first communication link.

In operation 403, the electronic device 101 may process WiFi data traffic. In an embodiment, the electronic device 101 may process WiFi data traffic, within the adjusted response time 405. In an embodiment, a time of processing the WiFi data traffic may be shorter than the adjusted response time 405. That is, within the adjusted response time 405, the electronic device 101 may process WiFi data traffic having a higher priority than a response of the first external electronic device 201.

In operation 407, the electronic device 101 may receive a response for data from the first external electronic device 201. In an embodiment, the electronic device 101 may transmit the data and receive the response for the data from the first external electronic device 201 within the adjusted response time 405. In an embodiment, the response may be an ACK indicating that data is normally received. In an embodiment, the response may be a NACK indicating that data is not normally received.

Referring to the above description, the electronic device 101 may adjust a response time (e.g., T_IFS). That is, the electronic device 101 may adjust the response time flexibly depending on a situation, instead of communicating with the first external electronic device 201 at a fixed response time (e.g., 150 μs). Therefore, at the occurrence of a situation in which communication with the first external electronic device 201 is not complete, the electronic device 101 may adjust the response time to avoid a waste of resources and deterioration of communication quality.

Figure 5:
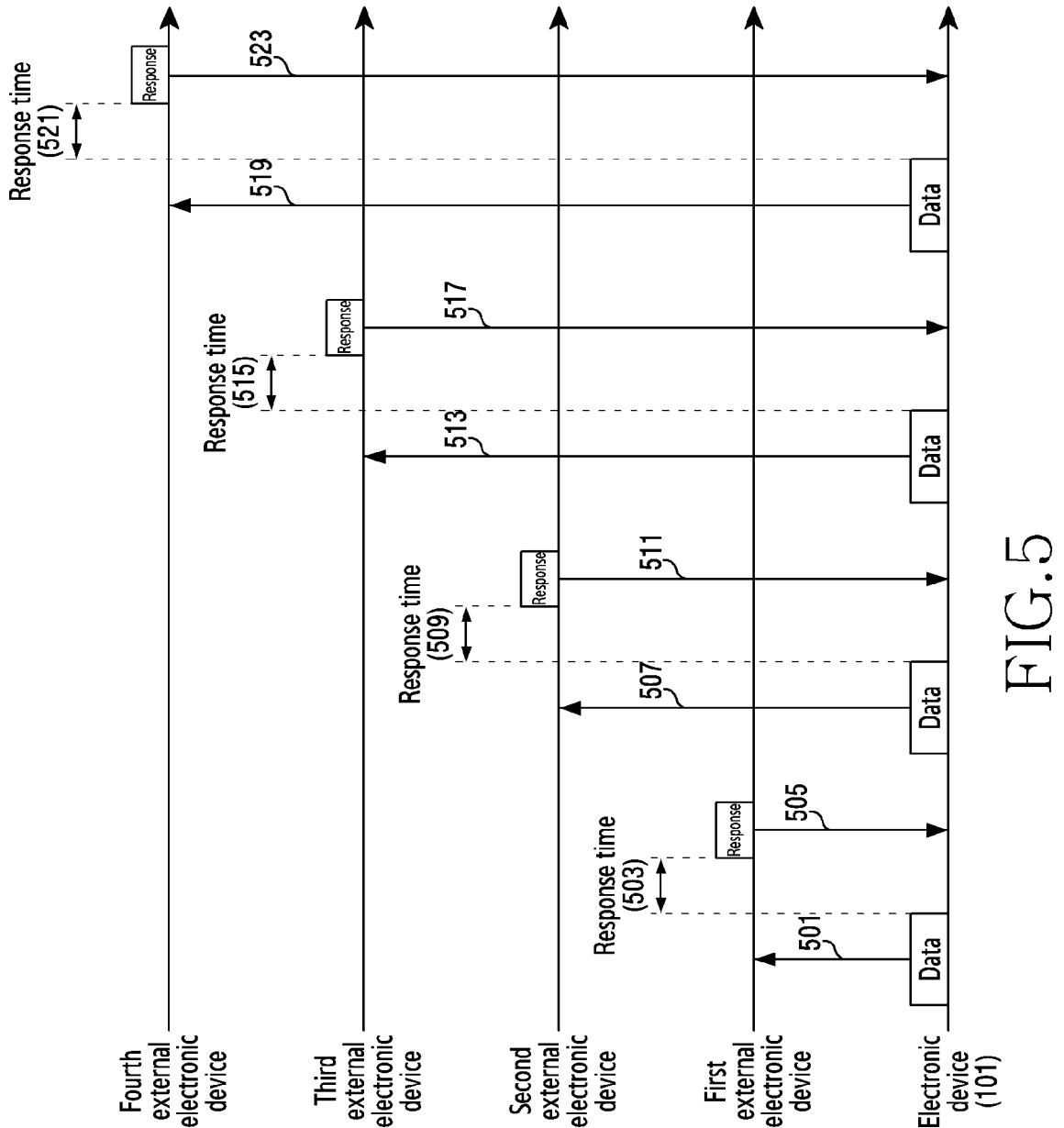
FIG. 5 illustrates a signal flow between an electronic device and external electronic devices according to an embodiment of the disclosure.

FIG. 5 illustrates a signal flow between an electronic device and external electronic devices according to an embodiment of the disclosure. Operations of the electronic device 101 for transmitting/receiving data with respect to external electronic device (e.g., a first external electronic device, a second external electronic device, a third external electronic device, and a fourth external electronic device) through respective communication links (e.g., a first communication link, a second communication link, a third communication link, and a fourth communication link) are described in FIG. 5.

Referring to FIG. 5, in operation 501, the electronic device 101 may transmit data to the first external electronic device through the first communication link. In operation 505, the electronic device 101 may transmit data and receive a response for the data from the first external electronic device through the first communication link at a response time 503. In an embodiment, the response time 503 may be a specified time (e.g., 150 μs).

In operation 507, the electronic device 101 may transmit data to the second external electronic device through the second communication link. In operation 511, the electronic device 101 may transmit data and receive a response for the data from the second external electronic device through the second communication link at a response time 509. In an embodiment, the response time 509 may be a specified time (e.g., 150 μs).

In operation 513, the electronic device 101 may transmit data to the third external electronic device through the third communication link. In operation 517, the electronic device 101 may transmit data and receive a response for the data from the third external electronic device through the third communication link at a response time 515. In an embodiment, the response time 515 may be a specified time (e.g., 150 μs).

In operation 519, the electronic device 101 may transmit data to the fourth external electronic device through the fourth communication link. In operation 523, the electronic device 101 may transmit data and receive a response for the data from the fourth external electronic device through the fourth communication link at a response time 521. In an embodiment, the response time 521 may be a specified time (e.g., 150 μs).

Referring to the above description, the electronic device 101 may perform communication in such a manner that data is transmitted to each of external electronic devices and a response is received from each of the external electronic devices. Therefore, since the same data is transmitted several times, a connection interval is increased, and a resource of the electronic device 101 is wasted. In addition thereto, since overall quality deteriorates when any one of a plurality of communication links deteriorates, there is a need for a method of integrating communication links with the external electronic devices.

Figure 6:
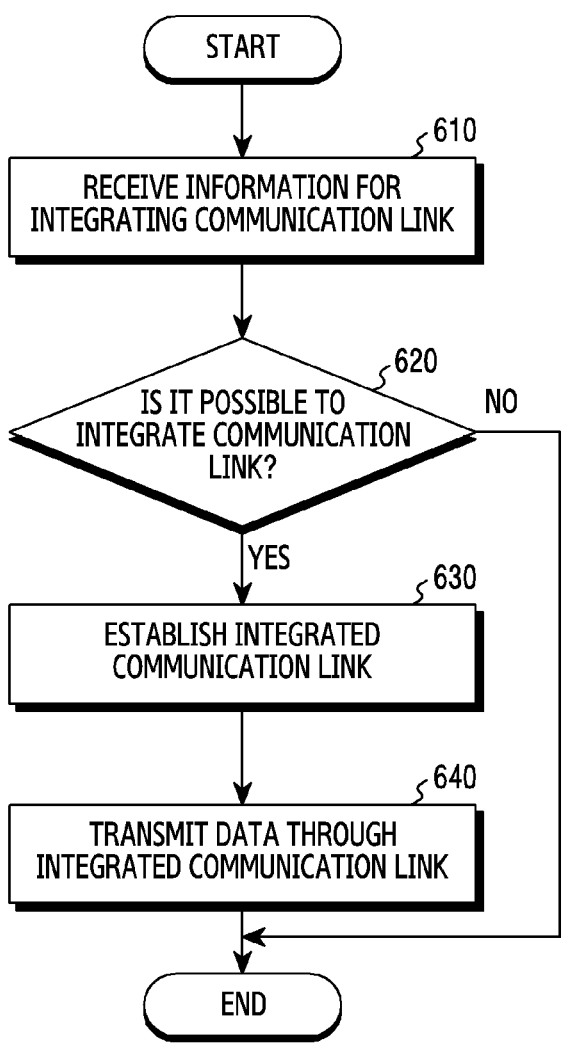
FIG. 6 illustrates an operational flow of an electronic device for integrating communication links according to an embodiment of the disclosure.

FIG. 6 illustrates an operational flow of an electronic device for integrating communication links according to an embodiment of the disclosure. Operations of the electronic device 101 for integrating communication links with external electronic devices are described in FIG. 6. A state in which the electronic device 101 establishes a communication link directly or indirectly with the external electronic devices is premised in FIG. 6.

Referring to FIG. 6, in operation 610, the electronic device 101 may receive information required to integrate the communication link. In an embodiment, the information required to integrate the communication link may be included in an advertising signal transmitted from the external electronic devices. In an embodiment, if the information required to integrate the communication links is not included in the advertising signal, the electronic device 101 may receive the information required to integrate the communication link through the communication links established with the external electronic devices. In an embodiment, in case of a second wireless connection structure, the electronic device 101 may receive the information required to integrate the communication link of the external electronic devices through the external electronic devices (e.g., the first external electronic device 201, the second external electronic device 203) through respective communication links (e.g., the first communication link, the second communication link). In an embodiment, in case of a first wireless connection structure or a third wireless connection structure, the electronic device 101 may receive the information required to integrate the communication link of another external electronic device (e.g., the second external electronic device 203) from one (e.g., the first external electronic device 201) of the external electronic devices. In an embodiment, the information required to integrate the communication link may include information on data that can be received by the external electronic devices, information (e.g., an audio service) on a service performed by the external electronic devices, information (e.g., a left audio role, a right audio role) on a role performed by the external electronic devices, or a combination thereof.

In operation 620, the electronic device 101 may identify whether the communication link can be integrated. In an embodiment, the electronic device 101 may identify whether the communication links with the external electronic devices can be integrated, based on the information required to integrate the communication link. In an embodiment, if the external electronic devices can receive the same data, the electronic device 101 may identify that the communication links with the external electronic devices can be integrated. In an embodiment, if the external electronic devices perform the same service, the electronic device 101 may identify that the communication links with the external electronic devices can be integrated. For example, if all of the external electronic devices perform an audio service for reproducing audio content, the electronic device 101 may identify that the communication links with the external electronic devices can be integrated. In an embodiment, if the external electronic devices perform the same role, the electronic device 101 may identify that the communication links with the external electronic devices can be integrated. For example, if all of the external electronic devices reproduce audio content with the same role (e.g., to the right or left), the electronic device 101 may identify that the communication links with the external electronic devices can be integrated.

In an embodiment, if the communication link can be integrated, the electronic device 101 may perform operation 603. In an embodiment, if the communication link cannot be integrated, the electronic device 101 may end the operation based on FIG. 6.

In operation 630, the electronic device 101 may establish one integrated communication link with the external electronic devices. In an embodiment, the electronic device 101 may establish the integrated communication link by allowing other communication links to operate in the same way as a corresponding link in a state of maintaining one of the existing communication links with the external electronic devices. In an embodiment, the electronic device 101 may establish an integrated communication link different from the existing communication links with the external electronic devices. Meanwhile, although it is described in FIG. 6 under the premise that the communication link is directly or indirectly established with the external electronic devices, a situation in which a communication link is not established with some electronic devices may also be included in an embodiment of the disclosure. In an embodiment, the electronic device 101 may receive an advertising signal for establishing the communication link from the external electronic device. In an embodiment, the electronic device 101 may assign an access address for a pre-established communication link to an external electronic device which has transmitted the advertising signal, and may transmit information on a response time, thereby establishing an integrated communication link.

In an embodiment, the electronic device 101 may determine a response time of each of the external electronic devices. In an embodiment, the electronic device 101 may determine the response time of each of the external electronic devices, based on a size of data to be transmitted commonly to the external electronic devices, a time depending on a WiFi/Bluetooth coexistence operation, a time depending on a Bluetooth concurrency operation, a battery state, whether a service is performed on a real-time basis, a size of a response, or a combination thereof.

In an embodiment, the electronic device 101 may establish an integrated communication link by transmitting information related to the integrated communication link to the external electronic devices. In an embodiment, the information related to the integrated communication link may include information indicating a transmission time point, an access address, a connection interval, a slave latency, a connection supervision timeout, a response time of each of the external electronic devices, or a combination thereof.

In operation 640, the electronic device 101 may transmit common data to the external electronic devices through the integrated communication link. That is, since the electronic device 101 transmits data to the external electronic devices at a time through the integrated communication link, efficiency of a communication link may be higher than a case where data is transmitted through each communication link.

Although not shown in FIG. 6, after establishing the integrated communication link, the electronic device 101 may adjust at least one of response times. In an embodiment, after the integrated communication link is established with the external electronic devices, the electronic device 101 may adjust at least one of the response times, based on a specific event. In an embodiment, if the number of times of retransmitting the same data to the external electronic devices through the integrated communication link is greater than or equal to a specified value (e.g., 3), the electronic device 101 may determine that one of the response times is to be adjusted. In an embodiment, the electronic device 101 may determine to adjust a response time of external electronic devices which have transmitted a NACK, during the same data is transmitted. In an embodiment, the electronic device 101 may transmit a link change message to the external electronic devices corresponding to at least one response time determined to be adjusted. In an embodiment, the link change message may include information on the adjusted response time.

Figure 7:
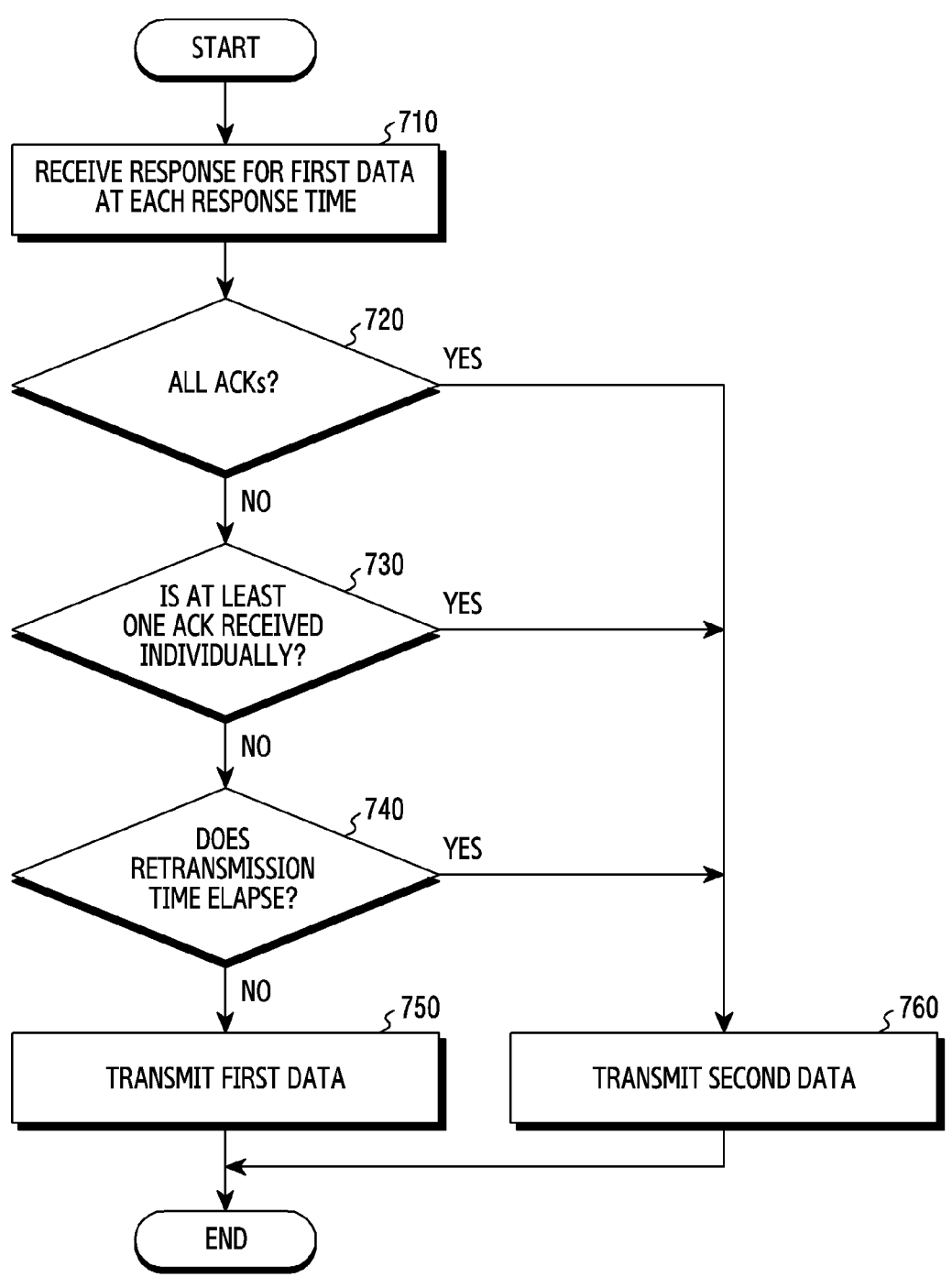
FIG. 7 illustrates an operational flow of an electronic device, based on responses received from external electronic devices, according to an embodiment of the disclosure.

FIG. 7 illustrates an operational flow of an electronic device, based on responses received from external electronic devices, according to an embodiment of the disclosure. Operations of the electronic device 101 for determining data to be transmitted at a next transmission opportunity, based on responses received from external electronic devices included in an integrated communication link, are described in FIG. 7.

Referring to FIG. 7, in operation 710, the electronic device 101 may receive a response for first data from the external electronic devices included in the integrated communication link. In an embodiment, the electronic device 101 may sequentially receive responses for the first data at each response time from the external electronic devices included in the integrated communication link. In an embodiment, each response time may be a time interval between a time point at which the electronic device 101 transmits data to the external electronic devices and a time point at which a response is received from the external electronic devices. In an embodiment, the received responses may be an ACK indicating that the first data is normally received or a NACK indicating that the first data is not received. In an embodiment, respective response times of the external electronic devices may be different from each other.

In operation 720, the electronic device 101 may identify whether all response for the first data received from the external electronic devices included in the integrated communication links are ACKs.

In an embodiment, if all responses for the received first data are the ACKs, the electronic device 101 may perform operation 760. In an embodiment, if at least one of the responses for the received first data is the NACK, the electronic device 101 may perform operation 730.

In operation 730, the electronic device 101 may identify whether at least one ACK is received individually from the external electronic devices included in the integrated communication link. In an embodiment, in the presence of at least one retransmission, the electronic device 101 may identify whether at least one ACK is received individually from the external electronic devices included in the integrated communication link.

In an embodiment, if at least one ACK is received individually from the external electronic devices included in the integrated communication link, the electronic device 101 may perform operation 760. In an embodiment, if at least one ACK is not received individually from the external electronic devices included in the integrated communication link, the electronic device 101 may perform operation 740.

In operation 740, the electronic device 101 may identify whether a retransmission time elapses. In an embodiment, the retransmission time may be a period in which the electronic device 101 gives up transmission of the first data irrespective of ACK reception and transmits second data as next data. In an embodiment, the retransmission time may be an interval between a time point at which the first data is transmitted and any time point greater than or equal to a connection interval.

In an embodiment, if the retransmission time elapses, the electronic device 101 may perform operation 760. In an embodiment, if the retransmission time does not elapse, the electronic device 101 may perform operation 750.

In operation 750, the electronic device 101 may retransmit the first data to the external electronic devices included in the integrated communication link. That is, if the ACK is not received from each of the external electronic devices included in the integrated communication link and the retransmission does not elapse, the electronic device 101 may retransmit the first data.

In operation 760, the electronic device 101 may transmit the second data as next data, to the external electronic devices included in the integrated communication link. In an embodiment, if all responses received from the external electronic devices included in the integrated communication link are ACKs, the electronic device 101 may transmit the second data as next data. In an embodiment, if at least one of the responses received respectively from the external electronic devices included in the integrated communication link is the ACK, the electronic device 101 may transmit the second data as next data. In an embodiment, even if the ACK is not received from the external electronic devices included in the integrated communication link, the electronic device 101 may transmit the second data as next data, when the retransmission time elapses.

Figure 8:
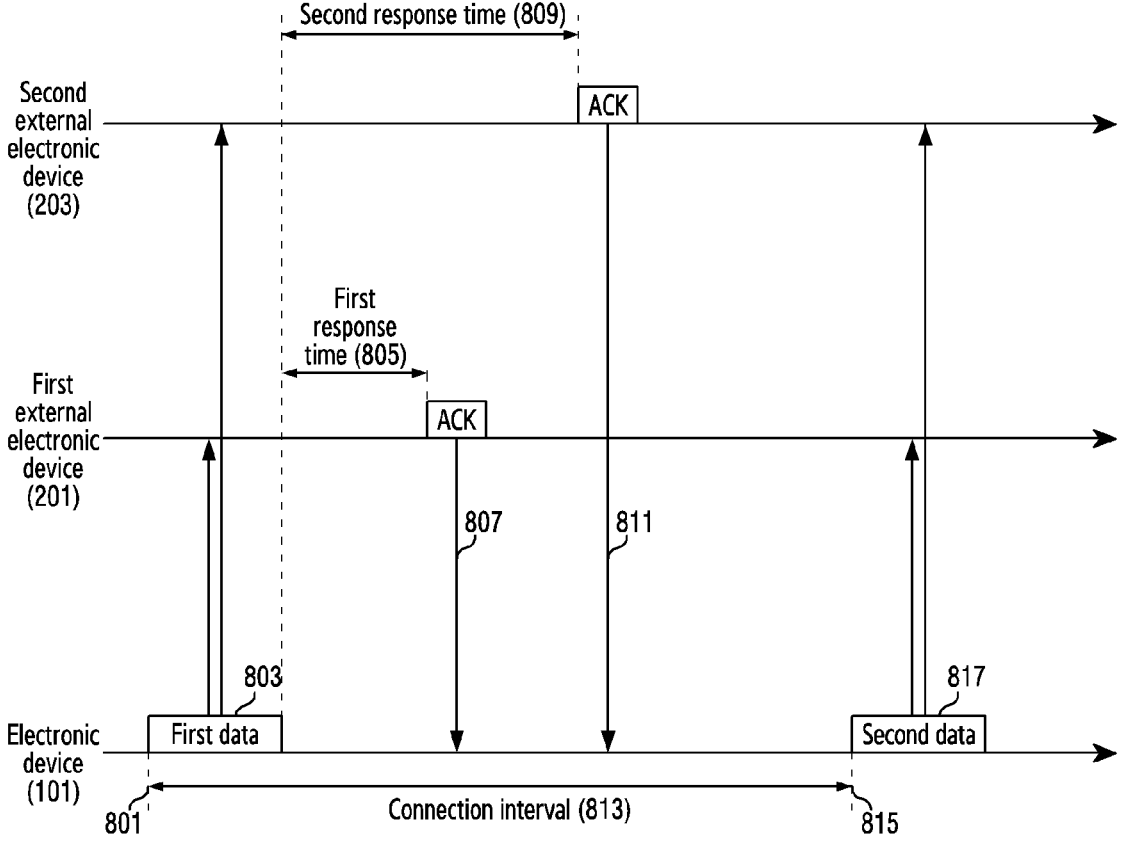
FIG. 8 illustrates a signal flow between an electronic device and external electronic devices through an integrated communication link according to an embodiment of the disclosure.

FIG. 8 illustrates a signal flow between an electronic device and external electronic devices through an integrated communication link according to an embodiment of the disclosure. Operations of the electronic device 101 for performing operations 720 and 760 of FIG. 7 are described in FIG. 8. A case where electronic devices (e.g., the electronic device 101, the first external electronic device 201, and the second external electronic device 203) establish an integrated communication link in one of a first wireless connection structure, a second wireless connection structure, and a third wireless connection structure is premised in FIG. 8.

In an embodiment, the first external electronic device 201 and the second external electronic device 203 may be one of a device in a type operable in a state of being worn (or inserted) on a user's body (e.g., an ear), an earphone, a headphone, a speaker, a TV, a headset, an audio device, a portable multimedia playback device, a smartphone, a tablet, a PC, a laptop, a desktop, and an MP3 player.

In an embodiment, data (e.g., first data, second data) transmitted from the electronic device 101 may consist of a field including at least one of a preamble, an access address, a Protocol Data Unit (PDU), a Cyclic Redundancy Check (CRC), and a Message Integrity Check (MIC).

Referring to FIG. 8, in operation 803, the electronic device 101 may transmit first data through an integrated communication link. In an embodiment, the electronic device 101 may transmit the first data to the first external electronic device 201 and the second external electronic device 203 through the integrated communication link at a first transmission time point 801. In an embodiment, the first transmission time point 801 may be one of a transmission time point of a first communication link with the first external electronic device 201 before being integrated, a transmission time point of a second communication link with the second external electronic device 203 before being integrated, and a newly defined transmission time point.

In operation 807, the electronic device 101 may receive a response for the first data from the first external electronic device 201 through the integrated communication link. In an embodiment, the electronic device 101 may transmit the first data, and may receive the response for the first data from the first external electronic device 201 through the integrated communication link at a first response time 805. In an embodiment, the response for the first data received from the first external electronic device 201 may be either an ACK or a NACK.

In operation 811, the electronic device 101 may receive the response for the first data from the second external electronic device 203 through the integrated communication link. In an embodiment, the electronic device 101 may transmit the first data, and may receive the response for the first data from the second external electronic device 203 through the integrated communication link at a second response time 809. In an embodiment, the response for the first data received from the second external electronic device 203 may be either the ACK or the NACK.

In an embodiment, the electronic device 101 may identify whether the received response is the ACK or the NACK, based on the SN and the NESN. In an embodiment, if the SN and the NESN, which are included in the response for the first data, are different, the electronic device 101 may identify that the received response is the ACK. In an embodiment, if it is identified that the received response is the ACK, the electronic device 101 may transmit the second data by increasing the SN included in the second data to indicate that next data is transmitted to the first external electronic device 201 and the second external electronic device 203. In an embodiment, if the SN and the NESN, which are included in the response for the first data, are identical, the electronic device 101 may identify that the received response is the NACK. In an embodiment, if it is identified that the received response is the NACK, the electronic device 101 may transmit the first data with no change in the SN to indicate that the same first data is retransmitted to the first external electronic device 201 and the second external electronic device 203.

In operation 817, if all responses for the first data are specified responses (e.g., ACKs), the electronic device 101 may transmit the second data as next data at a next transmission opportunity (e.g., the second transmission time point 815). In an embodiment, if all responses from the first external electronic device 201 and the second external electronic device 203 are the specified responses (e.g., ACKs), the electronic device 101 may transmit the second data as next data to the first external electronic device 201 and the second external electronic device 203 at a next transmission opportunity (e.g., the second transmission time point 815). In an embodiment, the SN and the NESN, which are included in the second data, may be the same value. That is, the electronic device 101 may not retransmit the first data, since the ACK is received from all of external electronic devices included in an integrated communication link. In an embodiment, the second transmission time point 815 may be a time point elapsed by a connection interval 813 from the first transmission time point 801. In another embodiment, the second transmission time point 815 may be any time point within the connection interval 813 from the first transmission time point 801.

Although two external electronic devices (e.g., the first external electronic device 201, the second external electronic device 203) are illustrated in FIG. 8, this is for exemplary purposes only. In an embodiment, the electronic device 101 may establish an integrated communication link with at least three external electronic devices.

Figure 9:
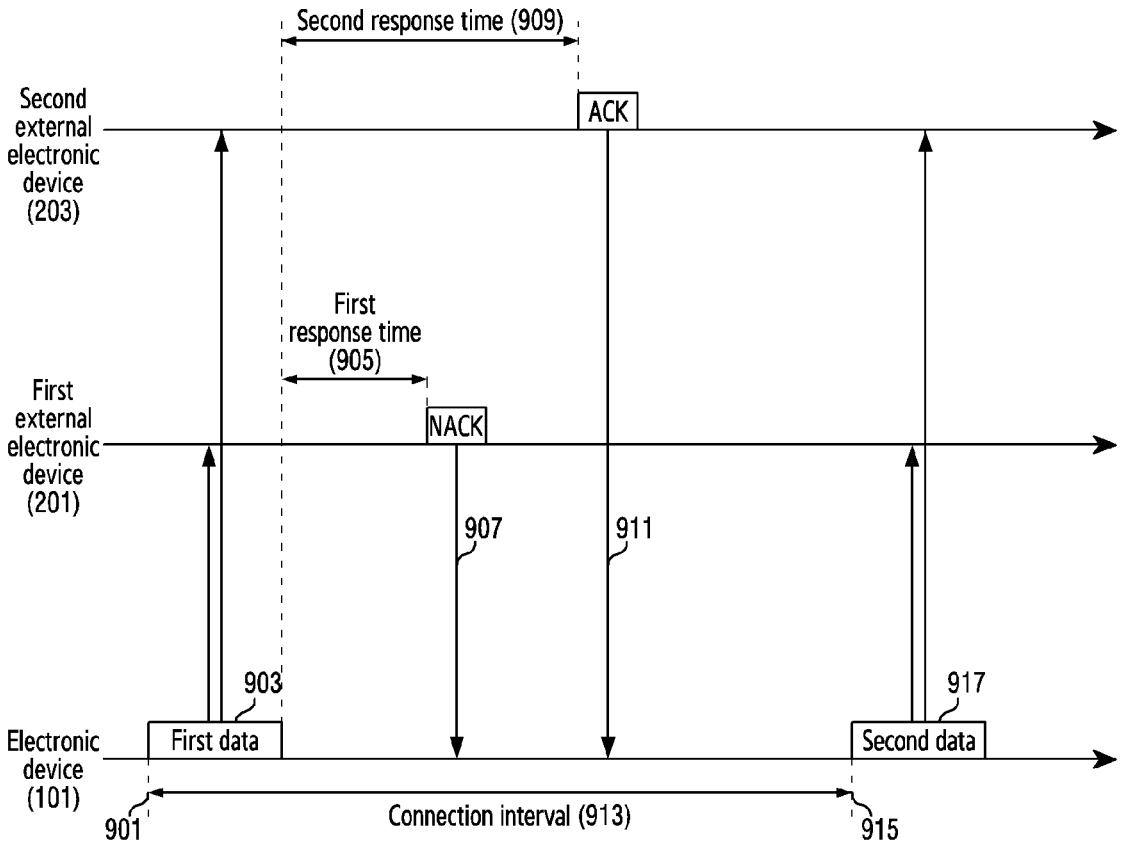
FIG. 9 illustrates a signal flow between an electronic device and external electronic devices through an integrated communication link according to an embodiment of the disclosure.

FIG. 9 illustrates a signal flow between an electronic device and external electronic devices through an integrated communication link according to an embodiment of the disclosure. Operations of the electronic device 101 for performing operations 720 and 750 of FIG. 7 are described in FIG. 9. A case where electronic devices (e.g., the electronic device 101, the first external electronic device 201, and the second external electronic device 203) establish an integrated communication link in one of a first wireless connection structure, a second wireless connection structure, and a third wireless connection structure is premised in FIG. 9.

In an embodiment, the first external electronic device 201 and the second external electronic device 203 may be one of a device in a type operable in a state of being worn (or inserted) on a user's body (e.g., an ear), an earphone, a headphone, a speaker, a TV, a headset, an audio device, a portable multimedia playback device, a smartphone, a tablet, a PC, a laptop, a desktop, and an MP3 player.

In an embodiment, data (e.g., first data) transmitted from the electronic device 101 may consist of a field including at least one of a preamble, a Protocol Data Unit (PDU), a Cyclic Redundancy Check (CRC), and a Message Integrity Check (MIC).

Referring to FIG. 9, in operation 903, the electronic device 101 may transmit first data through an integrated communication link. In an embodiment, the electronic device 101 may transmit the first data to the first external electronic device 201 and the second external electronic device 203 through the integrated communication link at a first transmission time point 901. In an embodiment, the first transmission time point 901 may be one of a transmission time point of a first communication link with the first external electronic device 201 before being integrated, a transmission time point of a second communication link with the second external electronic device 203 before being integrated, and a newly defined transmission time point.

In operation 907, the electronic device 101 may receive a response for the first data from the first external electronic device 201 through the integrated communication link. In an embodiment, the electronic device 101 may transmit the first data, and may receive the response for the first data from the first external electronic device 201 through the integrated communication link at a first response time 905. In an embodiment, the response for the first data received from the first external electronic device 201 may be either the ACK or the NACK.

In operation 911, the electronic device 101 may receive the response for the first data from the second external electronic device 203 through the integrated communication link. In an embodiment, the electronic device 101 may transmit the first data, and may receive the response for the first data from the second external electronic device 203 through the integrated communication link at a second response time 909. In an embodiment, the response for the first data received from the second external electronic device 203 may be either the ACK or the NACK.

In an embodiment, the electronic device 101 may identify whether the received response is the ACK or the NACK, based on the SN and the NESN. In an embodiment, if the SN and the NESN, which are included in the response for the first data, are different, the electronic device 101 may identify that the received response is the ACK. In an embodiment, if it is identified that the received response is the ACK, the electronic device 101 may transmit the second data by increasing the SN included in the second data to indicate that next data is transmitted to the first external electronic device 201 and the second external electronic device 203. In an embodiment, if the SN and the NESN, which are included in the response for the first data, are identical, the electronic device 101 may identify that the received response is the NACK. In an embodiment, if it is identified that the received response is the NACK, the electronic device 101 may transmit the first data with no change in the SN to indicate that the same first data is retransmitted to the first external electronic device 201 and the second external electronic device 203.

In operation 917, if at least one of responses for the first data is a specified response (e.g., NACK), the electronic device 101 may retransmit the first data at a next transmission opportunity (e.g., a second transmission time point 915). In an embodiment, if at least one of the responses from the first external electronic device 201 and the second external electronic device 203 is the specified response (e.g., NACK), the electronic device 101 may retransmit the first data to the first external electronic device 201 and the second external electronic device 203 at a next transmission opportunity (e.g., the second transmission time point 915). In an embodiment, the SN and the NESN, which are included in the second data, may be different values. That is, if at least one of the responses from the first external electronic device 201 and the second external electronic device 203 for the first data is the NACK, the electronic device 101 may retransmit the first data since the first external electronic device 201 or the second external electronic devices 203 does not normally receive the first data. In an embodiment, the second transmission time point 915 may be a time point elapsed by a connection interval 913 from the first transmission time point 901. In another embodiment, the second transmission time point 915 may be any time point within the connection interval 913 from the first transmission time point 901.

Although two external electronic devices (e.g., the first external electronic device 201, the second external electronic device 203) are illustrated in FIG. 9, this is for exemplary purposes only. In an embodiment, the electronic device 101 may establish an integrated communication link with at least three external electronic devices.

Figure 10:
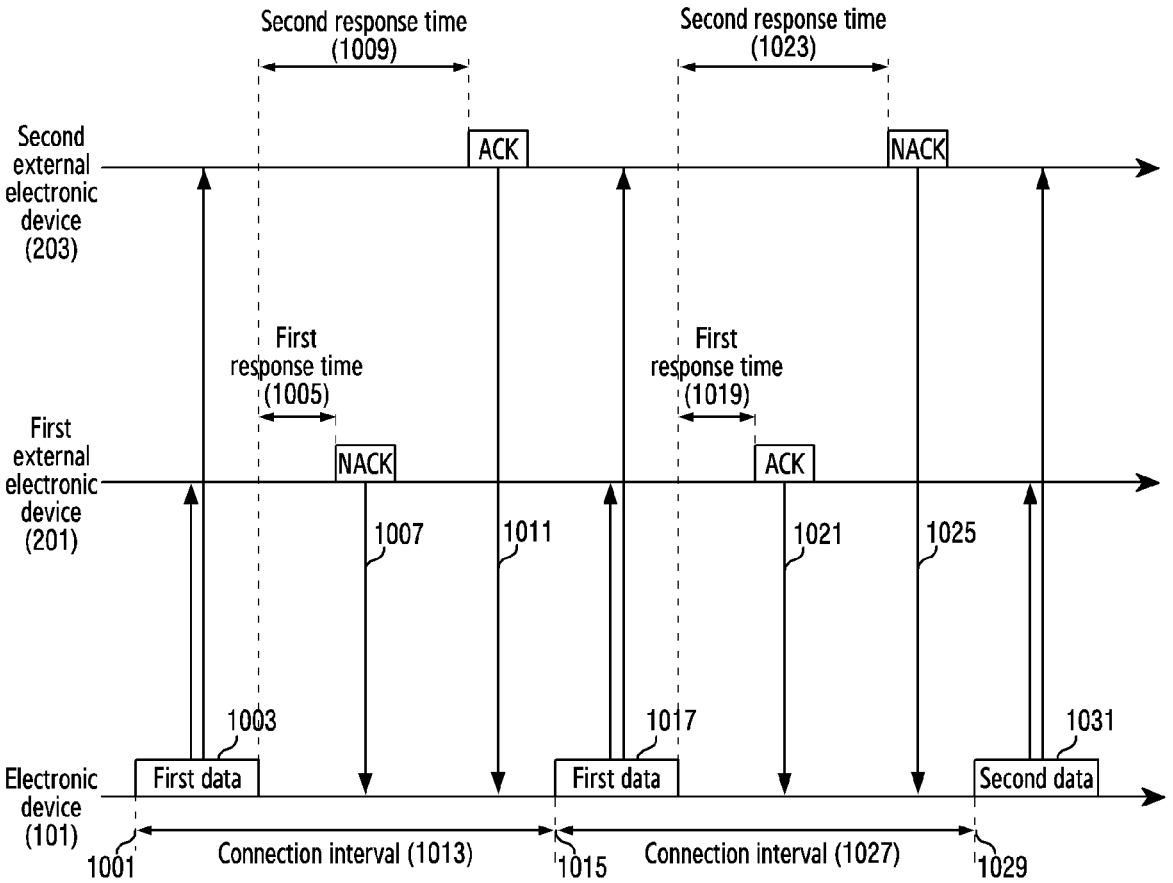
FIG. 10 illustrates a signal flow between an electronic device and external electronic devices through an integrated communication link according to an embodiment of the disclosure.

FIG. 10 illustrates a signal flow between an electronic device and external electronic devices through an integrated communication link according to an embodiment of the disclosure. Operations of the electronic device 101 for performing operations 730 and 760 of FIG. 7 are described in FIG. 10. A case where electronic devices (e.g., the electronic device 101, the first external electronic device 201, and the second external electronic device 203) establish an integrated communication link in one of a first wireless connection structure, a second wireless connection structure, and a third wireless connection structure is premised in FIG. 10.

In an embodiment, the first external electronic device 201 and the second external electronic device 203 may be one of a device in a type operable in a state of being worn (or inserted) on a user's body (e.g., an ear), an earphone, a headphone, a speaker, a TV, a headset, an audio device, a portable multimedia playback device, a smartphone, a tablet, a PC, a laptop, a desktop, and an MP3 player.

In an embodiment, data (e.g., first data, second data) transmitted from the electronic device 101 may consist of a field including at least one of a preamble, an access address, a Protocol Data Unit (PDU), a Cyclic Redundancy Check (CRC), and a Message Integrity Check (MIC).

Since reference marks 1001 to 1017 of FIG. 10 are the same as reference marks 901 to 917 of FIG. 9, descriptions thereof will be omitted hereinafter.

Referring to FIG. 10, in operation 1021, the electronic device 101 may receive a response for first data retransmitted from the first external electronic device 201 through an integrated communication link. In an embodiment, the electronic device 101 may retransmit the first data, and may receive the response for the first data retransmitted from the first external electronic device 201 through the integrated communication link at a first response time 1019. In an embodiment, the response for the retransmitted first data received from the first external electronic device 201 may be either an ACK or a NACK.

In operation 1025, the electronic device 101 may receive the response for the first data retransmitted from the second external electronic device 203 through the integrated communication link. In an embodiment, the electronic device 101 may retransmit the first data, and may receive the response for the first data retransmitted from the second external electronic device 203 at a second response time 1023. In an embodiment, the response for the retransmitted first data received from the second external electronic device 203 may be either the ACK or the NACK.

In an embodiment, the electronic device 101 may identify whether the received response is the ACK or the NACK, based on the SN and the NESN. In an embodiment, if the SN and the NESN, which are included in the response for the first data, are different, the electronic device 101 may identify that the received response is the ACK. In an embodiment, if it is identified that the received response is the ACK, the electronic device 101 may transmit the second data by increasing the SN included in the second data to indicate that next data is transmitted to the first external electronic device 201 and the second external electronic device 203. In an embodiment, if the SN and the NESN, which are included in the response for the first data, are identical, the electronic device 101 may identify that the received response is the NACK. In an embodiment, if it is identified that the received response is the NACK, the electronic device 101 may transmit the first data with no change in the SN to indicate that the same first data is retransmitted to the first external electronic device 201 and the second external electronic device 203.

In operation 1031, if at least one specified response (e.g., ACK) is received for the first data from each of external electronic devices, the electronic device 101 may transmit second data as next data at a next transmission opportunity (e.g., a third transmission time point 1029). In an embodiment, if at least one of responses from the first external electronic device 201 for the first data is the specified response (e.g., ACK) and if at least one responses from the second external electronic device 203 for the second data is the specified response (e.g., ACK), the electronic device 101 may transmit the second data as next data at the next transmission opportunity (e.g., the third transmission time point 1029). In an embodiment, the SN and the NESN, which are included in the second data, may be the same value. That is, if at least one of the responses from the first external electronic device 201 for the first data is the ACK and if at least one of the responses from the second external electronic device 203 for the first data is the ACK, the first external electronic device 201 and the second external electronic device 203 may not retransmit the first data since the first data is normally received. In an embodiment, the third transmission time point 1029 may be a time point elapsed by a connection interval 1027 from the second transmission time point 1015. In another embodiment, the third transmission time point 1029 may be any time point within the connection interval 1027 from the second transmission time point 1015. In an embodiment, the connection intervals 1013 and 1027 may be identical to or different from each other.

Although two external electronic devices (e.g., the first external electronic device 201, the second external electronic device 203) are illustrated in FIG. 10, this is for exemplary purposes only. In an embodiment, the electronic device 101 may establish an integrated communication link with at least three external electronic devices.

Figure 11:
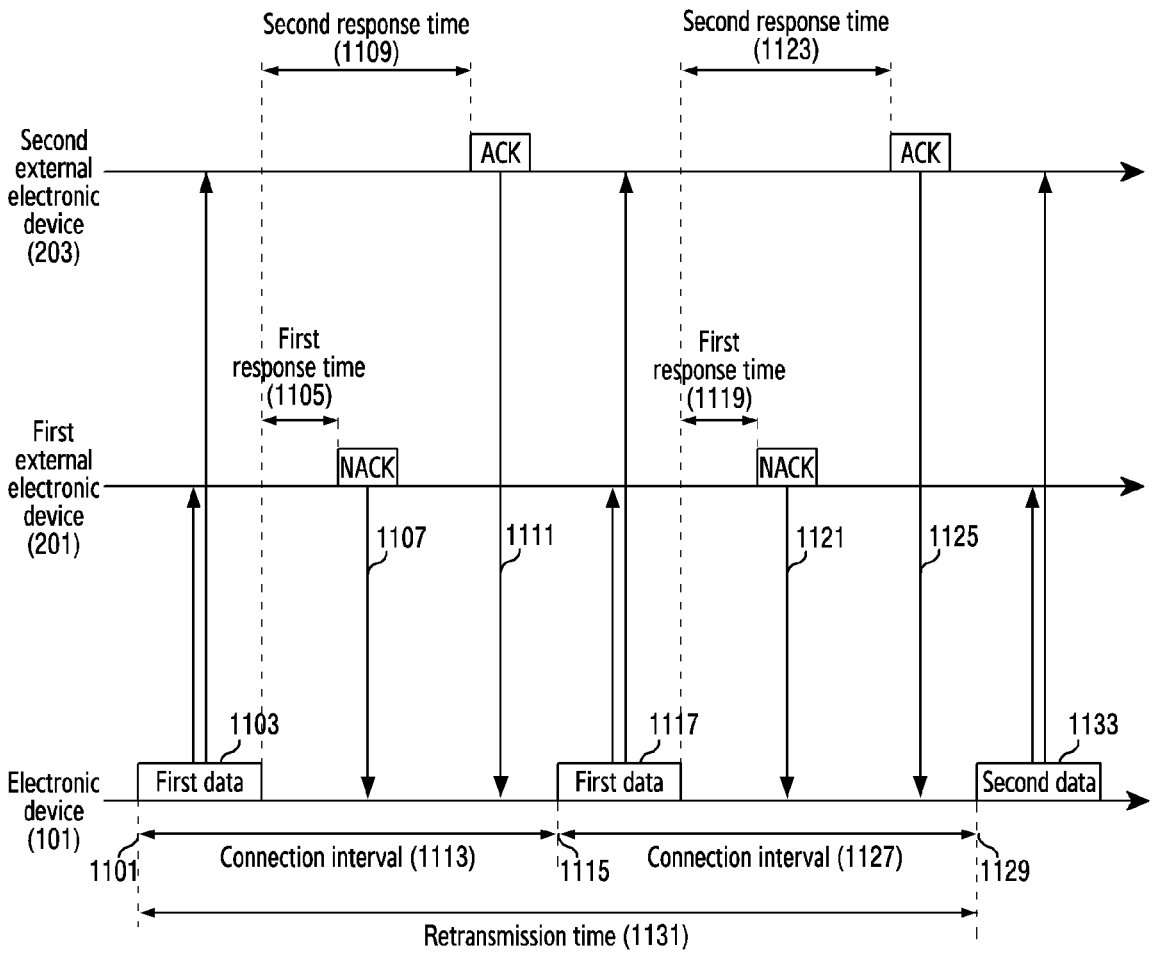
FIG. 11 illustrates a signal flow between an electronic device and external electronic devices through an integrated communication link according to an embodiment of the disclosure.

FIG. 11 illustrates a signal flow between an electronic device and external electronic devices through an integrated communication link according to an embodiment of the disclosure. Operations of the electronic device 101 for performing operations 740 and 760 of FIG. 7 are described in FIG. 11. A case where electronic devices (e.g., the electronic device 101, the first external electronic device 201, and the second external electronic device 203) establish an integrated communication link in one of a first wireless connection structure, a second wireless connection structure, and a third wireless connection structure is premised in FIG. 11.

Since reference marks 1101 to 1117 of FIG. 11 are the same as reference marks 901 to 917 of FIG. 9, descriptions thereof will be omitted hereinafter.

Referring to FIG. 11, in operation 1121, the electronic device 101 may receive a response for first data retransmitted from the first external electronic device 201 through an integrated communication link. In an embodiment, the electronic device 101 may retransmit the first data, and may receive the response for the first data retransmitted from the first external electronic device 201 through the integrated communication link at a first response time 1119. In an embodiment, the response for the retransmitted first data received from the first external electronic device 201 may be either an ACK or a NACK.

In operation 1125, the electronic device 101 may receive the response for the first data retransmitted from the second external electronic device 203 through the integrated communication link. In an embodiment, the electronic device 101 may retransmit the first data, and may receive the response for the first data retransmitted from the second external electronic device 203 through the integrated communication link at a second response time 1123. In an embodiment, the response for the retransmitted first data received from the second external electronic device 203 may be either the ACK or the NACK.

As described above with reference to FIGS. 8 to 10, when the electronic device 101 does not receive at least one ACK from the first external electronic device 201 or does not receive at least one ACK from the second external electronic device 203, the first data may be retransmitted. However, when the ACK is not received only from a specific external electronic device (e.g., the second external electronic device 203), efficiency of the entire link may deteriorate if the same data is persistently retransmitted. In an embodiment, the electronic device 101 may transmit next data, based on a retransmission time. In an embodiment, the retransmission time may be a period in which the electronic device 101 transmits the next data irrespective of ACK reception.

In operation 1133, if a retransmission time 1131 elapses, the electronic device 101 may transmit second data as next data. In an embodiment, even if all responses received from the first external electronic device 201 or the second external electronic device 203 are specified responses (e.g., NACKs), the electronic device 101 may transmit the second data as next data at a next transmission opportunity (e.g., a third transmission time point 1129) if the retransmission time 1131 elapses. In an embodiment, even if all responses received from the first external electronic device 201 are specified responses (e.g., ACKs) and all responses received from the second external electronic device 203 are specified responses (e.g., NACKs), the electronic device 101 may transmit the second data as next data at the next transmission opportunity (e.g., the third transmission time point 1129) if the retransmission time 1131 elapses. That is, even if the electronic device 101 does not receive the ACK for data during the retransmission time 1131 from a specific external electronic device (e.g., the second external electronic device 203), for efficiency of the entire link, the electronic device 101 may transmit the next data. In an embodiment, the retransmission time 1131 may be longer than connection intervals 1113 and 1127. In an embodiment, the third transmission time point 1129 may be a time point elapsed by the connection interval 1127 from a second transmission time point 1115. In another embodiment, the third transmission time point 1129 may be any time point within the connection interval 1127 from the second transmission time point 1115.

Although two external electronic devices (e.g., the first external electronic device 201, the second external electronic device 203) are illustrated in FIG. 11, this is for exemplary purposes only. In an embodiment, the electronic device 101 may establish an integrated communication link with at least three external electronic devices.

Figure 12:
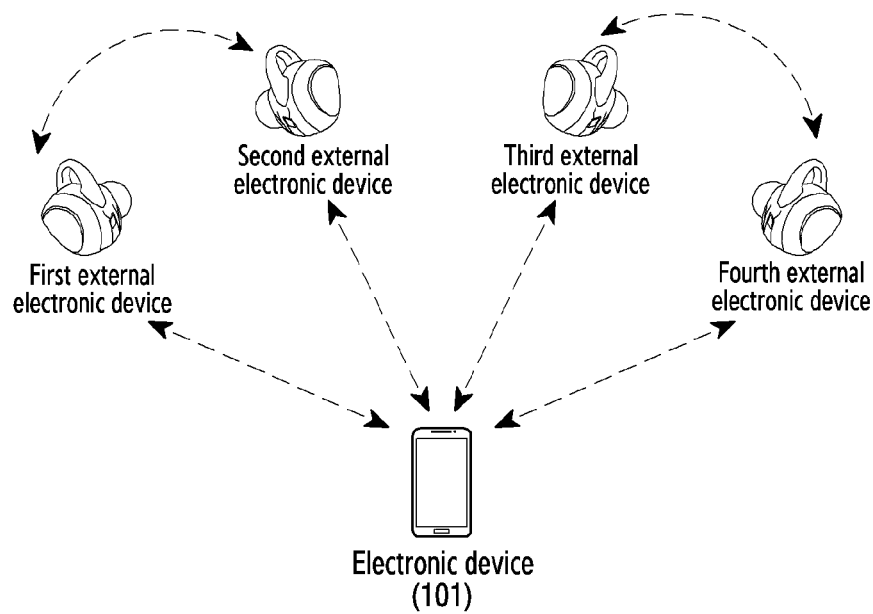
FIG. 12 illustrates electronic devices according to an embodiment of the disclosure.

FIG. 12 illustrates electronic devices according to an embodiment of the disclosure. A procedure in which electronic devices (e.g., the electronic device 101, the first external electronic device, the second external electronic device, the third external electronic device, the fourth external electronic device) establish an integrated communication link is described in FIG. 12. The electronic device 101 may be described with reference to the structures of FIG. 1. The external electronic devices (e.g., the first external electronic device, the second external electronic device, the third external electronic device, and the fourth external electronic device) may be described with reference to the structures of FIG. 2. In addition, in FIG. 12, the first external electronic device which outputs left audio data and the second external electronic device which outputs right audio data may constitute one set, and the third external electronic device which outputs left audio data and the fourth external electronic device which outputs right audio data may constitute one set.

Referring to FIG. 12, a state in which the electronic device 101 establishes a communication link directly or indirectly with the external electronic devices (e.g., the first external electronic device, the second external electronic device, the third external electronic device, and the fourth external electronic device) is premised. Although communication links between the electronic device 101 and the external electronic devices may be described with reference to the first wireless connection structure, second wireless connection structure, and third wireless connection structure described in FIG. 2, the disclosure is not limited thereto. In an embodiment, the first communication link may be a communication link between the electronic device 101 and the first external electronic device. In an embodiment, the second communication link may be a communication link between the electronic device 101 and the second external electronic device. In an embodiment, the third communication link may be a communication link between the electronic device 101 and the third external electronic device. In an embodiment, the fourth communication link may be a communication link between the electronic device 101 and the fourth external electronic device. In an embodiment, a communication link A may be a communication link between the first external electronic device and the second external electronic device. In an embodiment, a communication link B may be a communication link between the third external electronic device and the fourth external electronic device.

In an embodiment, the electronic device 101 may receive information required to integrate the communication link. In an embodiment, the information required to integrate the communication link may be included in an advertising signal transmitted from the external electronic devices. In an embodiment, if the information required to integrate the communication links is not included in the advertising signal, the electronic device 101 may receive the information required to integrate the communication link through at least one of the communication links established with the external electronic devices. For example, in a second wireless connection structure or a third wireless connection structure, the electronic device 101 may receive the information required to integrate the communication link of the first external electronic device and the second external electronic device 203 through the first communication link, and may receive the information required to integrate the communication link with the third external electronic device and the fourth external electronic device through the third communication link. In an embodiment, the information required to integrate the communication link may include information on data that can be received by the external electronic devices, information (e.g., an audio service) on a service performed by the external electronic devices, information (e.g., a left audio role, a right audio role) on a role performed by the external electronic devices, or a combination thereof.

The electronic device 101 may identify whether the communication link can be integrated. In an embodiment, the electronic device 101 may identify whether the communication links with the external electronic devices can be integrated, based on the information required to integrate the communication link. In an embodiment, if the external electronic devices can receive the same data, the electronic device 101 may identify that the communication links with the external electronic devices can be integrated. In an embodiment, if the external electronic devices provide the same service, the electronic device 101 may identify that the communication links with the external electronic devices can be integrated. For example, since all of the external electronic devices (e.g., the first external electronic device, the second external electronic device, the third external electronic device, and the fourth external electronic device) provide the audio service, the electronic device 101 may identify that the communication links with the external electronic devices can be integrated.

In an embodiment, the electronic device 101 may establish the integrated communication link with the external electronic devices. In an embodiment, the electronic device 101 may establish the integrated communication link by allowing other communication links to operate in the same way as one of the existing communication links. In an embodiment, the electronic device 101 may establish an integrated communication link different from the existing communication links with the external electronic devices. Meanwhile, although it is described in FIG. 12 under the premise that the communication link is directly or indirectly established with the external electronic devices, a case in which a communication link is not established with some electronic devices may also be included in an embodiment of the disclosure. In an embodiment, the electronic device 101 may receive an advertising signal for establishing the communication link from the external electronic device. In an embodiment, the electronic device 101 may assign an access address for a pre-established communication link to an external electronic device which has transmitted the advertising signal, and may transmit information on a response time, thereby establishing an integrated communication link.

In an embodiment, the electronic device 101 may determine a response time to be applied to the integrated communication link. In an embodiment, the electronic device 101 may determine a response time to be applied to respective sets of the external electronic devices. For example, the electronic device 101 may determine a first response time to be assigned to the first and second external electronic devices constituting a first set and a second response time to be assigned to the third and fourth external electronic devices constituting a second set. In an embodiment, the electronic device 101 may determine the response time, based on a role performed by the external electronic devices. For example, the electronic device 101 may determine a first response time to be assigned to the first and third external electronic devices which perform a left audio role and a second response time to be assigned to the second and fourth external electronic devices which perform a right audio role.

In an embodiment, the electronic device 101 may transmit information related to the integrated communication link to the external electronic devices. In an embodiment, the information related to the integrated communication link may include information indicating an instant, an access address, a connection interval, a slave latency, a connection supervision timeout, a response time, or a combination thereof.

Figure 13:
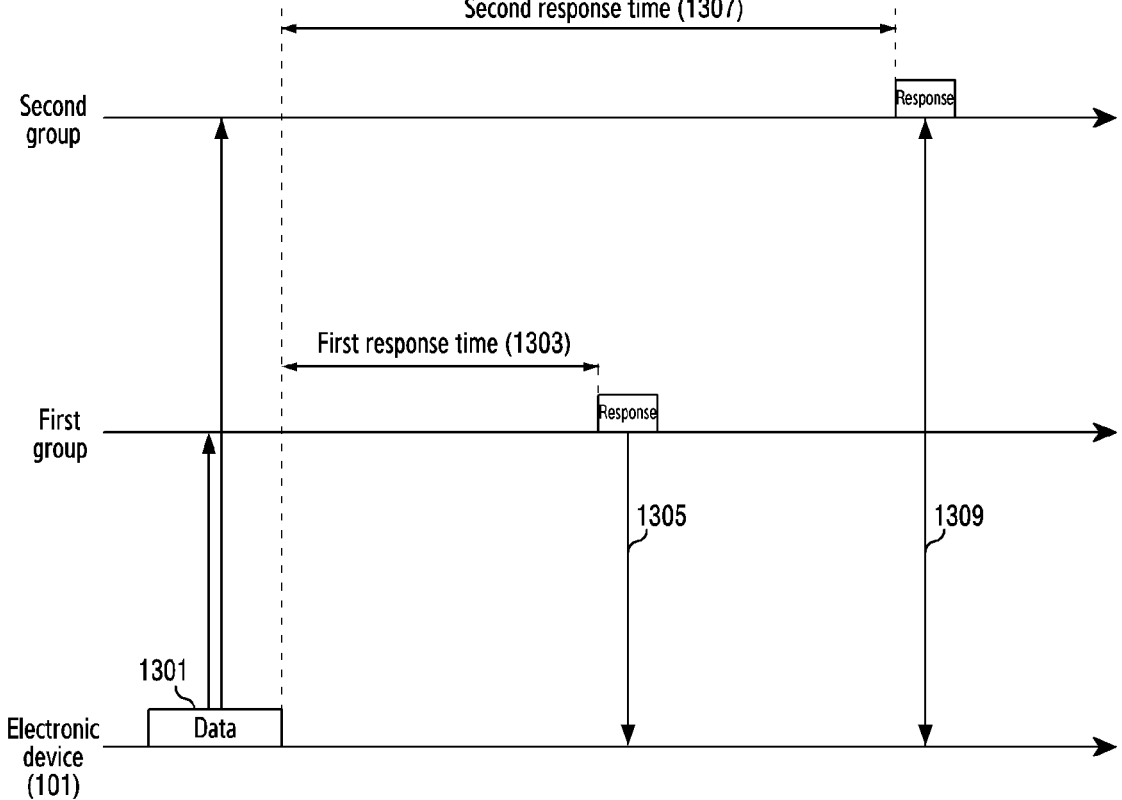
FIG. 13 illustrates a signal flow between an electronic device and external electronic devices through an integrated communication link according to an embodiment of the disclosure.

FIG. 13 illustrates a signal flow between an electronic device and external electronic devices through an integrated communication link according to an embodiment of the disclosure. A case where electronic devices (e.g., the electronic device 101, the first external electronic device 201, the second external electronic device, and the third external electronic device) supporting a stereo audio service establish an integrated communication link according to the procedure describe in FIG. 12 is premised in FIG. 13.

Referring to FIG. 13, in an embodiment, a first group may include first and second external electronic devices which constitute a first set, and a second group may include third and fourth external electronic devices which constitute a second set. In an embodiment, the first group may include the first and third external electronic devices which perform a left audio role, and the second group may include the second and fourth external electronic devices which perform a right audio role.

In operation 1301, the electronic device 101 may transmit data. In an embodiment, the electronic device 101 may transmit audio data to the first group and the second group. For example, the electronic device 101 may transmit the audio data to the first group and the second group, the first and third external electronic devices which perform the left audio role may output left audio data, based on the received audio data, and the second and fourth external electronic devices which perform the right audio role may output right audio data, based on the received audio data. In an embodiment, the electronic device 101 may transmit data, based on the roles performed by the external electronic devices. For example, the electronic device 101 may transmit data to the external electronic devices (e.g., the first external electronic device and the third external electronic device) of the first group which performs the left audio role, and may transmit right audio data to the external electronic devices (e.g., the second external electronic device and the fourth external electronic device) of the second group which performs the right audio role.

In operation 1305, the electronic device 101 may receive a response for the data from the external electronic devices included in the first group. In an embodiment, the electronic device 101 may receive the response for the data at a first response time 1303 from the first and second external electronic devices which constitute the first set. In an embodiment, the electronic device 101 may receive the response for the data at the first response time 1303 from the first and third external electronic devices which perform the left audio role. In an embodiment, the received response may be either an ACK or a NACK.

In operation 1309, the electronic device 101 may receive the response for the data from the external electronic devices included in the second group. In an embodiment, the electronic device 101 may receive the response for the data at a second response time 1307 from the third and fourth external electronic devices which constitute the second set. In an embodiment, the electronic device 101 may receive the response for the data at the second response time 1307 from the second and fourth external electronic devices which perform the right audio role. In an embodiment, the received response may be either the ACK or the NACK.

In an embodiment, the electronic device 101 may identify whether the received response is the ACK or the NACK, based on an SN and an NESN, which are included in the received response. In an embodiment, if the SN and the NESN, which are included in the received response, are different, the electronic device 101 may identify that the received response is the ACK. In an embodiment, if the SN and the NESN, which are included in the received response, are identical, the electronic device 101 may identify that the received response is the NACK.

Although not shown in FIG. 13, the electronic device 101 may transmit the same data or next data, based on the received response, which may be described with reference to FIGS. 7 to 11.

Figure 14:
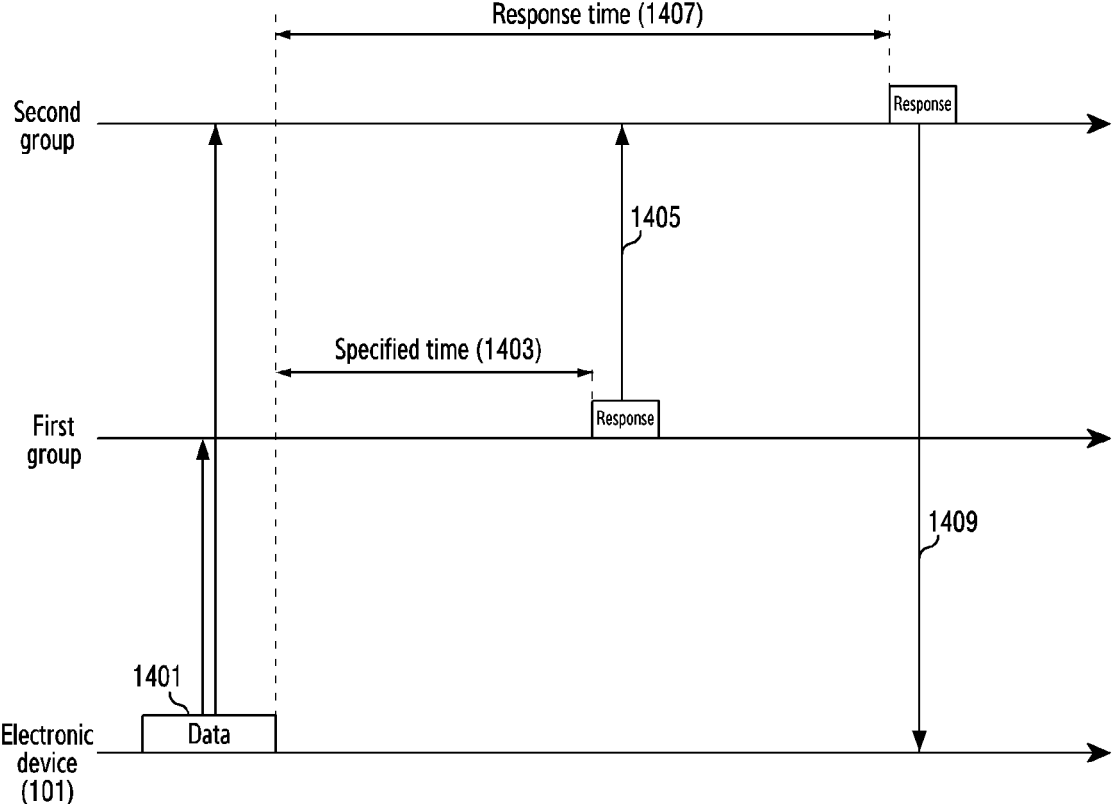
FIG. 14 illustrates a signal flow between an electronic device and external electronic devices through an integrated communication link according to an embodiment of the disclosure.

FIG. 14 illustrates a signal flow between an electronic device and external electronic devices through an integrated communication link according to an embodiment of the disclosure. A case where electronic devices (e.g., the electronic device 101, the first external electronic device 201, the second external electronic device, and the third external electronic device) supporting a stereo audio service establish an integrated communication link according to the procedure describe in FIG. 12 is premised in FIG. 14.

Referring to FIG. 14, in an embodiment, a first group may include first and second external electronic devices which constitute a first set, and a second group may include third and fourth external electronic devices which constitute a second set. In an embodiment, the first group may include the first and third external electronic devices which perform a left audio role, and the second group may include the second and fourth external electronic devices which perform a right audio role.

In operation 1401, the electronic device 101 may transmit data. In an embodiment, the electronic device 101 may transmit audio data to the first group and the second group. For example, the electronic device 101 may transmit the audio data to the first group and the second group, the first and third external electronic devices which perform the left audio role may output left audio data, based on the received audio data, and the second and fourth external electronic devices which perform the right audio role may output right audio data, based on the received audio data. In an embodiment, the electronic device 101 may transmit data, based on the roles performed by the external electronic devices. For example, the electronic device 101 may transmit data to the external electronic devices (e.g., the first external electronic device and the third external electronic device) of the first group which performs the left audio role, and may transmit right audio data to the external electronic devices (e.g., the second external electronic device and the fourth external electronic device) of the second group which performs the right audio role.

In operation 1405, the external electronic devices belonging to the first group may transmit a response for data to at least one of the external electronic devices belonging to the second group. In an embodiment, the external electronic devices belonging to the first group may transmit a response for data to at least one of the external electronic devices belonging to the second group at a specified time 1403. In an embodiment, the specified time 1403 may be shorter than a response time 1407.

In an embodiment, the external electronic devices belonging to the second group which receives a response for data from the first group may determine a response to be transmitted to the electronic device 101. In an embodiment, the external electronic devices belonging to the second group which receives a response for data from the first group may determine a response to be transmitted to the electronic device 101 as an ACK, if all received responses and all responses to be transmitted by the external electronic device are ACKs. In an embodiment, if at least one of the received responses and the responses to be transmitted by the external electronic device is a NACK, the external electronic devices belonging to the second group which receives a response for data from the first group may determine a response to be transmitted to the electronic device 101 as the NACK.

In operation 1409, the electronic device 101 may receive a response for data from the external electronic devices belonging to the second group. In an embodiment, the electronic device 101 may receive the response for the data from the external electronic devices belonging to the second group at the response time 1407.

Although not shown in FIG. 14, the electronic device 101 may transmit the same data or next data, based on the received response, which may be described with reference to FIGS. 7 to 11.

Figure 15:
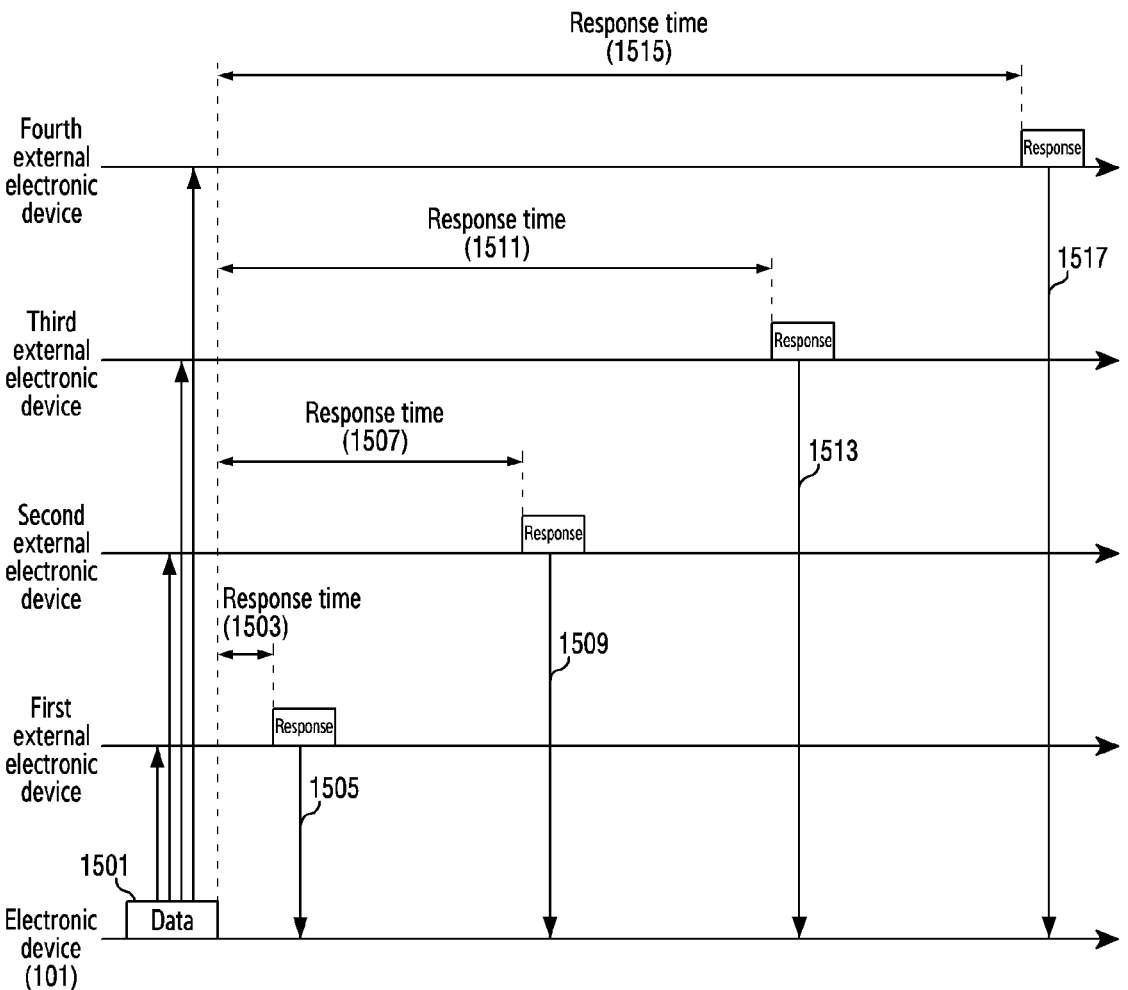
FIG. 15 illustrates a signal flow between an electronic device and external electronic devices through an integrated communication link according to an embodiment of the disclosure.

FIG. 15 illustrates a signal flow between an electronic device and external electronic devices through an integrated communication link according to an embodiment of the disclosure. A case where electronic devices (e.g., the electronic device 101, the first external electronic device 201, the second external electronic device, and the third external electronic device) supporting a stereo audio service establish an integrated communication link according to the procedure describe in FIG. 12 is premised in FIG. 15.

Referring to FIG. 15, in operation 1501, the electronic device 101 may transmit data to external electronic devices (e.g., a first external electronic device, a second external electronic device, a third external electronic device, and a fourth external electronic device). In an embodiment, the electronic device 101 may transmit the same data to the external electronic devices. For example, when the external electronic devices perform a stereo audio service, the first and third external electronic devices for performing a left role may output left data, based on received audio data, and the second and fourth external electronic devices for performing a right role may output right data, based on the received audio data. In an embodiment, the electronic device 101 may transmit different data to the external electronic devices. For example, when the external electronic devices perform the stereo audio service, the electronic device 101 may transmit audio data corresponding to the left role to the first and third external electronic devices for performing the left role, and may transmit audio data corresponding to the right role to the second and fourth external electronic devices for performing the right role.

In operations 1505, 1509, 1513, and 1517, the electronic device 101 may receive responses for data transmitted to the external electronic devices (e.g., the first external electronic device, the second external electronic device, the third external electronic device, and the fourth external electronic device) at respective response times 1503, 1507, 1511, and 1515.

Although not shown in FIG. 15, the electronic device 101 may transmit the same data or next data, based on the received response, which may be described with reference to FIGS. 7 to 11.

Data communication through communication links established between the electronic device and the external electronic devices according to the method and data communication of the related art through an integrated communication link established between the electronic device and the external electronic devices according to the disclosure are compared with reference to FIGS. 1 to 11. When data is transmitted and a response is received through communication links established between the electronic device and the external electronic devices, since the same data shall be transmitted several times, efficiency of all communication links inevitably deteriorates. However, in case of the data communication through the integrated communication link according to various embodiments of the disclosure, effective link operations are possible in such a manner that data is transmitted at a time through the integrated communication link to external electronic devices capable of receiving the same data, and responses are received after respective defined response times elapse.

An electronic device according to an embodiment of the disclosure described above may include a communication circuit, and at least one processor operably coupled to the communication circuit. The at least one processor may be configured to identify whether a first communication link and a second communication link can be integrated, based on first information related to a first external device coupled through the first communication link and second information related to a second external device coupled through the second communication link, establish a common communication link with the first external device and the second external device, in response to identifying that the first communication link and the second communication link can be integrated, and transmit data to the first external device and the second external device through the common communication link.

In an embodiment, the first information may include at least one of information on data to be received by the first external device, information on a service performed by the first external device, and information on a role performed by the first external device. The second information may include at least one of information on data received by the second external device, information on a service performed by the second external device, and information on a role performed by the second external device.

In an embodiment, the at least one processor may be configured to identify whether common data can be transmitted to the first external device and the second external device, based on the first information and the second information, and identify that the first communication link and the second communication link can be integrated, upon identifying that the common data can be transmitted to the first external device and the second external device.

In an embodiment, the common communication link may be the first communication link.

In an embodiment, the at least one processor may be configured to determine a first response time for the first external device and a second response time for the second external device, transmit information on the first response time to the first external device, and transmit information on the second response time to the second external device.

In an embodiment, the at least one processor may be configured to receive a first response signal from the first external device at the first response time, and receive a second response signal from the second external device at the second response time.

In an embodiment, the first response time and the second response time may be determined based on a size of the data.

In an embodiment, the at least one processor may be configured to identify whether a retransmission time elapses, and transmit different data to the first external device and the second external device, in response to identifying that the retransmission time elapses.

A method performed by an electronic device according to an embodiment of the disclosure described above may include identifying whether a first communication link and a second communication link can be integrated, based on first information related to a first external device coupled through the first communication link and second information related to a second external device coupled through the second communication link, establishing a common communication link with the first external device and the second external device, in response to identifying that the first communication link and the second communication link can be integrated, and transmitting data to the first external device and the second external device through the common communication link.

In an embodiment, the first information may include at least one of information on data to be received by the first external device, information on a service performed by the first external device, and information on a role performed by the first external device. The second information may include at least one of information on data received by the second external device, information on a service performed by the second external device, and information on a role performed by the second external device.

In an embodiment, the method may further include identifying whether common data can be transmitted to the first external device and the second external device, based on the first information and the second information, and identifying that the first communication link and the second communication link can be integrated, upon identifying that the common data can be transmitted to the first external device and the second external device.

In an embodiment, the common communication link may be the first communication link.

In an embodiment, the method may further include determining a first response time for the first external device and a second response time for the second external device, transmitting information on the first response time to the first external device, and transmitting information on the second response time to the second external device.

In an embodiment, the method may include receiving a first response signal from the first external device at the first response time, and receiving a second response signal from the second external device at the second response time.

In an embodiment, the first response time and the second response time may be determined based on a size of the data.

In an embodiment, the method may include identifying whether a retransmission time elapses, and transmitting different data to the first external device and the second external device, in response to identifying that the retransmission time elapses.

An electronic device according to an embodiment of the disclosed described above may include a communication circuit, and at least one processor operably coupled to the communication circuit. The at least one processor may be configured to transmit data to a first external device coupled through a first communication link, receive a response for the data from the first external device at a first response time, and identify whether the response is an ACKnowledgement (ACK) or a Negative ACKnowledgement (NACK).

In an embodiment, the at least one processor may be configured to identify the number of times of transmitting the data to the first external device, in response to identifying that the response as the NACK, and adjust the first response time if the number of times of transmission exceeds a threshold.

In an embodiment, the at least one processor may be configured to identify a cause of failing in transmission of the data, in response to identifying the response as the NACK, and adjust the first response time, based on the failure cause.

In an embodiment, the at least one processor may be configured to receive an advertising signal from a second external device, assign an access address for the first external device to the second external device, and transmit a second response time for the second external device to the second external device.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a communication circuit; and
at least one processor operably coupled to the communication circuit,
wherein the at least one processor is configured to:
identify whether a first communication link and a second communication link can be integrated based on first information associated with a first external device coupled through the first communication link and second information associated with a second external device coupled through the second communication link,
establish a common communication link with the first external device and the second external device in response to identifying that the first communication link and the second communication link can be integrated,
transmit data to the first external device and the second external device through the common communication link, and receive, from the first external device, a first response signal for the data through the common communication link and receive, from the second external device, a second response signal for the data through the common communication link.

2. The electronic device of claim 1, wherein the first information comprises at least one of information on data to be received by the first external device, information on a service performed by the first external device, or information on a role performed by the first external device, and wherein the second information comprises at least one of information on data received by the second external device, information on a service performed by the second external device, or information on a role performed by the second external device.

3. The electronic device of claim 1, wherein the at least one processor is further configured to:

identify whether common data can be transmitted to the first external device and the second external device based on the first information and the second information, and identify that the first communication link and the second communication link can be integrated upon identifying that the common data can be transmitted to the first external device and the second external device.

4. The electronic device of claim 1, wherein the common communication link is the first communication link.

5. The electronic device of claim 1, wherein the at least one processor is further configured to:

determine a first response time for the first external device and a second response time for the second external device, transmit information on the first response time to the first external device, and transmit information on the second response time to the second external device.

6. The electronic device of claim 5, wherein the at least one processor is further configured to:

receive the first response signal from the first external device at the first response time, and receive the second response signal from the second external device at the second response time.

7. The electronic device of claim 6, wherein the at least one processor is further configured to:

identify whether a retransmission time elapses, and transmit different data to the first external device and the second external device in response to identifying that the retransmission time elapses.

8. The electronic device of claim 5, wherein the first response time and the second response time are determined based on a size of the data.

9. A method performed by an electronic device, the method comprising:

identifying whether a first communication link and a second communication link can be integrated based on first information associated with a first external device coupled through the first communication link and second information associated with a second external device coupled through the second communication link;

establishing a common communication link with the first external device and the second external device in response to identifying that the first communication link and the second communication link can be integrated;

transmitting data to the first external device and the second external device through the common communication link; and receiving, from the first external device, a first response signal for the data through the common communication link and receive, from the second external device, a second response signal for the data through the common communication link.

10. The method of claim 9, wherein the first information comprises at least one of information on data to be received by the first external device, information on a service performed by the first external device, or information on a role performed by the first external device, and wherein the second information comprises at least one of information on data received by the second external device, information on a service performed by the second external device, or information on a role performed by the second external device.

11. The method of claim 9, further comprising:

identifying whether common data can be transmitted to the first external device and the second external device based on the first information and the second information; and identifying that the first communication link and the second communication link can be integrated upon identifying that the common data can be transmitted to the first external device and the second external device.

12. The method of claim 9, wherein the common communication link is the first communication link.

13. The method of claim 9, further comprising determining a first response time for the first external device and a second response time for the second external device;

transmitting information on the first response time to the first external device; and transmitting information on the second response time to the second external device.

14. The method of claim 13, further comprising:

receiving the first response signal from the first external device at the first response time; and receiving the second response signal from the second external device at the second response time.

15. The method of claim 14, wherein the first response time and the second response time are determined based on a size of the data.

16. The method of claim 14, further comprising:

identifying whether a retransmission time elapses; and transmitting different data to the first external device and the second external device in response to identifying that the retransmission time elapses.

* * * * *